United States Patent
Bartling

(10) Patent No.: US 10,511,019 B2
(45) Date of Patent: Dec. 17, 2019

(54) ELECTRODE SOLUTIONS AND ELECTROCHEMICAL CELLS AND BATTERIES THEREFROM

(71) Applicant: 3M INNOVATIVE PROPERTIES COMPANY, St. Paul, MN (US)

(72) Inventor: Brandon A. Bartling, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/083,462

(22) PCT Filed: Feb. 23, 2017

(86) PCT No.: PCT/US2017/019105
§ 371 (c)(1),
(2) Date: Sep. 7, 2018

(87) PCT Pub. No.: WO2017/155700
PCT Pub. Date: Sep. 14, 2017

(65) Prior Publication Data
US 2019/0131620 A1    May 2, 2019

Related U.S. Application Data

(60) Provisional application No. 62/306,238, filed on Mar. 10, 2016.

(51) Int. Cl.
*H01M 4/36* (2006.01)
*H01M 4/86* (2006.01)
(Continued)

(52) U.S. Cl.
CPC ........... *H01M 4/366* (2013.01); *H01M 4/368* (2013.01); *H01M 4/86* (2013.01); *H01M 4/8636* (2013.01);
(Continued)

(58) Field of Classification Search
CPC .... H01M 4/366; H01M 4/368; H01M 4/8636; H01M 4/8657
(Continued)

(56) References Cited

U.S. PATENT DOCUMENTS 4,126,733 A    11/1978 Doniat
4,166,885 A    9/1979 Durand
(Continued)

FOREIGN PATENT DOCUMENTS

CN    102315473    1/2012
CN    103247816    8/2013
(Continued)

OTHER PUBLICATIONS

Duduta, "Semi-Solid Lithium Rechargeable Flow Battery", Advanced Energy Materials, Jul. 2011, vol. 1, No. 4, pp. 511-516.
(Continued)

*Primary Examiner* — Basia A Ridley
*Assistant Examiner* — James M Erwin
(74) *Attorney, Agent, or Firm* — Thomas M. Spielbauer

(57) ABSTRACT

The present disclosure relates to liquid solutions which include particulates that can function as an electrode, thereby forming an electrode solution, useful in the fabrication of liquid flow electrochemical cells and liquid flow batteries. The electrode solutions of the present disclosure may include an electrolyte comprising a liquid medium and at least one redox active specie, wherein the electrolyte has a density, De; and a core-shell particulate (202, 204) having a core, a shell and a density Dp, wherein at least a portion of the shell of the core-shell particulate includes an electrically conductive first metal and wherein $0.8De \leq Dp \leq 1.2De$; and wherein a first redox active specie of the at least one redox active specie and the electrically conductive first metal are different elements. The present disclosure also provides electrochemical cells and liquid flow batteries comprising an electrode solution according to the present disclosure.

20 Claims, 7 Drawing Sheets

(51) Int. Cl.
*H01M 8/18* (2006.01)
*H01M 8/0202* (2016.01)

(52) U.S. Cl.
CPC ....... *H01M 4/8657* (2013.01); *H01M 8/0202* (2013.01); *H01M 8/188* (2013.01); *Y02E 60/528* (2013.01)

(58) Field of Classification Search
USPC ......................................................... 429/105
See application file for complete search history.

(56) References Cited

U.S. PATENT DOCUMENTS

| | | | |
|---|---|---|---|
| 4,612,242 | A | 9/1986 | Vesley |
| 4,948,682 | A | 8/1990 | Sonneveld |
| 5,368,952 | A | 11/1994 | Sonneveld |
| 5,648,184 | A | 7/1997 | Inoue |
| 7,727,931 | B2 | 6/2010 | Brey |
| 8,518,572 | B2 | 8/2013 | Kim |
| 2014/0028260 | A1 | 1/2014 | Goeltz |
| 2014/0030623 | A1 | 1/2014 | Chiang |
| 2014/0099569 | A1 | 4/2014 | Oh |
| 2014/0193687 | A1 | 7/2014 | Park |
| 2014/0255812 | A1 | 9/2014 | Fischel |
| 2014/0370403 | A1 | 12/2014 | Narayan |
| 2016/0126581 | A1* | 5/2016 | Timofeeva ............ H01M 8/188 429/81 |

FOREIGN PATENT DOCUMENTS

| | | |
|---|---|---|
| EP | 2876712 | 5/2015 |
| GB | 1500301 | 2/1978 |
| JP | 2011-184581 A | 9/2011 |
| WO | WO 2009-151639 | 12/2009 |
| WO | WO 2010-118060 | 10/2010 |
| WO | WO 2012-024499 | 2/2012 |
| WO | WO 2012-088442 | 6/2012 |
| WO | WO 2014-052682 | 4/2014 |

OTHER PUBLICATIONS

Hamelet, "Non-Aqueous Li-Based Redox Flow Batteries," Journal of the Electrochemical Society, Jul. 2012, vol. 159, No. 8, pp. A1360-A1367.

Hawthorne, "An Investigation into Factors Affecting the Iron Plating Reaction for an All-Iron Flow Battery," Journal of the Electrochemical Society, Jan. 2015, vol. 162, No. 1, pp. A108-A113.

Huang, "Reversible Chemical Delithiation/Lithiation of LiFePO4: Towards a Redox Flow Lithium-Ion Battery".

Kastening, "Design of a Slurry Electrode Reactor System," Journal of Applied Electrochemistry, Feb. 1997, vol. 27, No. 2, pp. 147-152.

Presser, "The Electrochemical Flow Capacitor: A New Concept for Rapid Energy Storage and Recovery", Advanced Energy Materials, Jul. 2012, vol. 2, No. 7, pp. 895-902.

Wang, "Li-Redox Flow Batteries Based on Hybrid Electrolytes: At the Cross Road between Li-ion and Redox Flow Batteries", Advanced Energy Materials, Jul. 2012, vol. 2, No. 7, pp. 770-779.

International Search Report for PCT International Application No. PCT/US2017/019105, dated Jun. 6, 2017, 6 pages.

* cited by examiner

US 10,511,019 B2

ELECTRODE SOLUTIONS AND ELECTROCHEMICAL CELLS AND BATTERIES THEREFROM

CROSS REFERENCE TO RELATED APPLICATIONS

This application is a national stage filing under 35 U.S.C. 371 of PCT/US2017/019105, filed Feb. 23, 2017, which claims the benefit of Provisional Application No. 62/306,238, filed Mar. 10, 2016, the disclosure of which is incorporated by reference in their entirety herein.

FIELD

The present invention generally relates to liquid solutions which include particulates that can function as an electrode, thereby forming an electrode solution, useful in the fabrication of electrochemical cells and batteries, including liquid flow electrochemical cells and liquid flow batteries. The disclosure further provides liquid flow cells and liquid flow batteries which include said electrode solutions.

BACKGROUND

Various components useful in the formation of electrochemical cells and redox flow batteries have been disclosed in the art. Such components are described in, for example, U.S. Pat. Nos. 5,648,184; 8,518,572; and 4,126,733 and U.S. Pat. Publ. No. 2014/030623.

SUMMARY

In one embodiment, the present disclosure provides an electrode solution for a liquid flow battery comprising:
an electrolyte comprising a liquid medium and at least one redox active specie, wherein the electrolyte has a density, De; and
a core-shell particulate having a core, a shell and a density Dp, wherein at least a portion of the shell of the core-shell particulate includes an electrically conductive first metal and wherein $0.8De \leq Dp \leq 1.2De$; and
wherein a first redox active specie of the at least one redox active specie and the electrically conductive first metal are different elements.

In another embodiment, the present disclosure provides an electrochemical cell for a liquid flow battery comprising:
a first electrode solution according to any one of the electrode solutions of the present disclosure;
an anode half-cell; and
a cathode half-cell; and
wherein at least one of the anode half-cell and cathode half-cell does not contain a stationary porous electrode and the first electrode solution is contained in the half-cell that does not contain a stationary porous electrode.

In yet another embodiment, the present disclosure provides a liquid flow battery comprising a first electrode solution according to any one of electrode solutions of the present disclosure.

Figure 1:
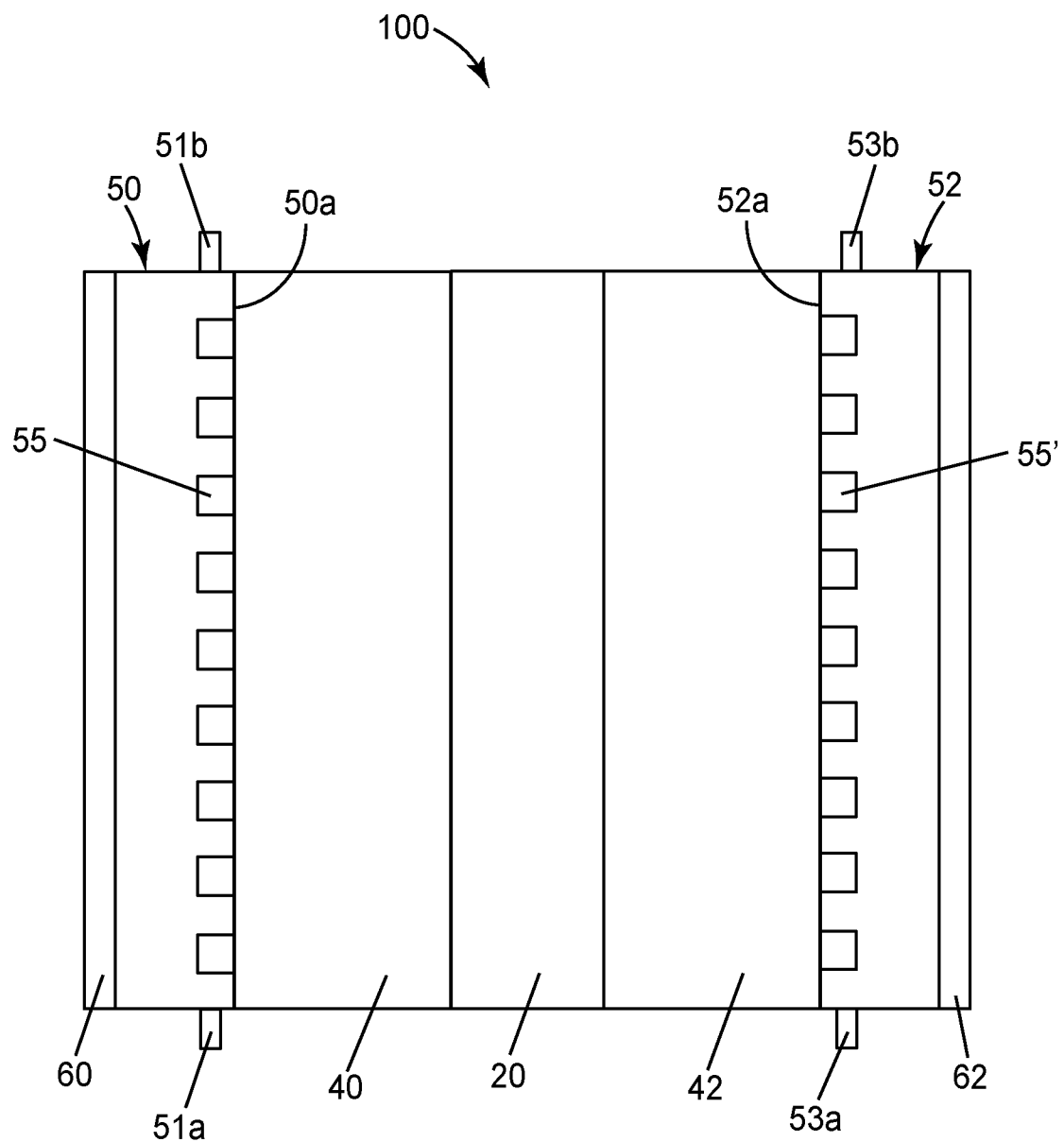
FIG. 1 shows a schematic cross-sectional view of an electrochemical cell which represents the prior art.

Repeated use of reference characters in the specification and drawings is intended to represent the same or analogous features or elements of the disclosure. The drawings may not be drawn to scale. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

Throughout this disclosure, if a surface of a first substrate is in "contact" with the surface of a second substrate, at least a portion of the two surfaces are in physical contact, i.e. there is no intervening substrate(s) disposed between the two substrates.

Throughout this disclosure, if a substrate or a surface of a substrate is "adjacent" to a second substrate or a surface of a second substrate, the two nearest surfaces of the two substrates are considered to be facing one another. They may be in contact with one another or they may not be in contact with one another, an intervening third substrate or substrate(s) being disposed between them.

Throughout this disclosure, if a surface of a first substrate is "proximate" to a surface of a second substrate, the two surface are considered to be facing one another and to be in close proximity to one another, i.e. to be within less than 500 microns, less than 250 microns, less than 100 microns or even in contact with one another. However, there may be one or more intervening substrates disposed between the first two substrate surfaces.

An "electrolyte" is a solution that contains ions allowing the solution to be electrically conductive.

An "electrode solution" is a solution that includes an electrolyte and a particulate capable of conducting electricity over at least a portion of its outer surface.

A "redox active species" is a material that is capable of undergoing at least one of an oxidation reaction and a reduction reaction or both.

An "anolyte" is an electrolytic solution that contains at least one redox active species capable of being oxidized.

A "catholyte" is an electrolytic solution that contains at least one redox active species capable of being reduced.

An "aqueous liquid medium" is a liquid medium that includes at least 40% water by weight, up to and including 100% water by weight.

A "non-aqueous liquid medium" is a liquid medium that includes less than 40% water by weight, down to and including 0% water by weight.

DETAILED DESCRIPTION

A single electrochemical cell 100 (see FIG. 1), e.g. liquid flow cell, which may be used in the fabrication of a liquid flow battery (e.g. a redox flow battery), generally, include two stationary porous electrodes 40, 42 (an anode and a cathode, respectively) one or both of which may be porous; an ion permeable membrane 20 disposed between the two electrodes, providing electrical insulation between the electrodes and providing a path for one or more select ionic species to pass between the anode and cathode half-cells; anode and cathode flow plates 50, 52, the former positioned adjacent the anode and the later positioned adjacent the cathode, each containing one or more flow channels 55, 55' which allow the anolyte and catholyte electrolyte solutions to contact and penetrate into the anode and cathode, respectively. The anode and cathode flow plates include fluid inlet ports 51a, 53a and fluid outlet ports 51b, 53b respectively. In a redox flow battery containing a single electrochemical cell, for example, the cell also include two current collectors 60, 62, one adjacent to and in contact with the exterior surface of the anode flow plate 50, e.g. a monopolar anode flow plate, and one adjacent to and in contact with the exterior surface of the cathode flow plate 50', e.g. a monopolar cathode flow plate. The current collectors allow electrons generated during cell discharge to connect to an external circuit and do useful work. Anode and cathode flow plates 50 and 52 include first surfaces 50a and 52a, respectively, and are in electrical communication with current collectors 60 and 62, respectively. In cell stacks that include more than one cell, interior anode and cathode flow plates may be bipolar plates, with the anode and cathode end plates, i.e. the two plates at the exterior of the cell stack, being monopolar plates. A functioning redox flow battery or electrochemical cell also includes an anolyte, anolyte reservoir and corresponding fluid distribution system (piping and at least one or more pumps) to facilitate flow of anolyte into the anode half-cell, and a catholyte, catholyte reservoir and corresponding fluid distribution system to facilitate flow of catholyte into the cathode half-cell (not shown in FIG. 1). Although pumps are typically employed, gravity feed systems may also be used. During discharge, redox active species, e.g. cations, in the anolyte are oxidized and the corresponding electrons flow though the exterior circuit and load to the cathode where they reduce redox active species in the catholyte. As the redox active species for electrochemical oxidation and reduction are contained in the anolyte and catholyte, redox flow cells and batteries have the unique feature of being able to store their energy outside the main body of the electrochemical cell, i.e. in the anolyte. The amount of storage capacity is mainly limited by the amount of anolyte and catholyte and the concentration of redox active species in these solutions. As such, redox flow batteries may be used for large scale energy storage needs associated with wind farms and solar energy plants, for example, by scaling the size of the reservoir tanks and redox active species concentrations, accordingly. Redox flow cells also have the advantage of having their storage capacity being independent of their power. The power in a redox flow battery or cell is generally determined by the size, power density (current density multiplied by the voltage) and number of membrane-electrode assemblies along with their corresponding flow plates (sometimes referred to in total as a "stack") within the battery. Additionally, as redox flow batteries are being designed for electrical grid use, the voltages must be high. However, the voltage of a single redox flow electrochemical cell is generally less than 4 volts (difference in the potential of the half-cell reactions making up the cell). As such, hundreds of cells are required to be connected in series to generate voltages great enough to have practical utility and a significant amount of the cost of the cell or battery relates to the cost of the components making an individual cell.

The electrodes of a liquid flow cell or liquid flow battery are typically fabricated from porous materials. Porous electrode materials provide greater surface area for the oxidation/reduction reactions to occur. Porous electrodes may include carbon fiber based papers, felts, and cloths. When porous electrodes are used, the electrolytes may penetrate into the body of the electrode, access the additional surface area for reaction and thus increase the rate of energy generation per unit volume of the electrode. Also, as one or both of the anolyte and catholyte may be water based, i.e. include an aqueous liquid medium, there may be a need for the electrode to have a hydrophilic surface, to facilitate anolyte and catholyte permeation into the body of a porous electrode. Surface treatments are often used to enhance the hydrophilicity of the redox flow electrodes, particularly carbon fiber based electrodes. However, as each cell requires two electrodes and many cells may be used in a liquid flow battery, the electrodes can be a costly component of a liquid flow electrochemical cell, e.g. a redox flow cell, and/or liquid flow battery, e.g. redox flow battery. Carbon fiber based electrodes may have higher unit cost than more conventional electrode materials such as copper and aluminum. Surface treatments of carbon electrodes add additional process steps and equipment requirements, which further increases their costs. Additionally, each layer, e.g. each electrode, of the flow cell or flow battery increases the manufacturing time and assembly costs during the fabrication process. Overall, there is a need to reduce the material, process and/or assembly costs of the electrode materials useful in the fabrication of liquid flow cells and liquid flow batteries.

In the embodiments of the present disclosure, the conventional stationary porous electrode of a liquid flow cell or half-cell, e.g. anode half-cell and/or cathode half-cell, may be replaced by a core-shell particulate, wherein at least a portion of the shell of the core-shell particulate includes an electrically conductive metal. The core-shell particulate is included in at least one of the anolyte and catholyte solutions and functions as the corresponding anode or cathode, depending on which half-cell it is contained in. Conventional metals may be used as the electrically conductive metal of the core-shell particulate and may decrease the cost of the flow cell or flow battery. The core-shell particulate, may have a large surface to volume ratio to maximize the area available for electrical conduction and oxidation and reduction reactions of the redox active species. This may be achieved by using very thin particulate, e.g. flakes, and/or very small sphere or spheroidal shaped particulate. Use of a core-shell particulate with a large surface to volume ratio may lead to improvements in the charge and discharge rates of a liquid flow cell or liquid flow battery.

One potential problem with the use of a conventional, solid metal particulate as the anode and/or cathode particulate is that the high density of the particulate relative to the electrolyte of the anolyte or catholyte would cause the particulate to settle out of the electrolyte and to no longer be homogenously dispersed in the electrolyte, particularly when the anolyte or catholyte is not flowing through the cell or battery or when the anolyte or catholyte are contained in their corresponding storage tanks, where flow rates would be low even during operation. Another potential problem with the use of a low density particulate as the anode and/or cathode particulate is that the particulate may float in the electrolyte and no longer be homogenously dispersed throughout the electrolyte. To circumvent these problems, the use of a core-shell particulate enables one to modify the density of the particulate such that the particulate density is similar to or the same as the density of the electrolyte of the anolyte or catholyte. The density of the core-shell particulate can be varied by the selection of the materials making up both the core and shell, (which are usually selected to have different densities) and the amount, e.g. mass or volume, of the core and shell used in the core-shell particulate. The density of the core-shell particulate may be varied according to the following equation:

$$Dp=(Mc+Ms)/(Vc+Vs)=(VcDc+VsDs)/(Vp)$$

where, $Dp$: density of the core-shell particulate (units of $g/cm^3$, for example)

$Dc$: density of the core of the core-shell particulate (units of $g/cm^3$, for example)

$Ds$: density of the shell of the core-shell particulate (units of $g/cm^3$, for example)

$Mc$: mass of the core of the core-shell particulate (units of g, for example)

$Ms$: mass of the shell of the core-shell particulate (units of g, for example)

$Vc$: volume of the core of the core-shell particulate (units of $cm^3$, for example)

$Vs$: volume of the shell of the core-shell particulate (units of $cm^3$ for example)

$Vp$: volume of the shell of the core-shell particulate (units of $cm^3$, for example)

$Vp=Vc+Vs$.

As the density of the core-shell particulate approaches that of the electrolyte of the anolyte or catholyte, the particulate becomes more neutrally buoyant and has less of a tendency to settle out of the electrolyte (if the density of the core shell particulate is greater than the density of the electrolyte of the anolyte or catholyte) or float in the electrolyte (if the density of the core shell particulate is less than the density of the electrolyte of the anolyte or catholyte). These issues, particulate settling out of the electrolyte or particulate floating in the electrolyte, may be overcome by the use of a core-shell particulate, which has been tuned to have a density similar to or equal to that of the electrolyte of the anolyte and/or catholyte. The core-shell particulates of the present disclosure, generally, have a lower density core, e.g. a solid polymer particle or ceramic bubble, used in combination with a higher density shell, e.g. metal, to achieve a density similar to that of the density of the electrolyte the particulate will be contained in.

The present disclosure provides an electrode solution for a liquid flow battery, the electrode solution includes i) an electrolyte comprising a liquid medium and at least one redox active species, wherein the electrolyte has a density, $De$; and ii) a core-shell particulate having a core, a shell and a density $Dp$, wherein at least a portion of the shell of the core-shell particulate includes an electrically conductive first metal; and wherein a first redox active specie of the at least one redox active specie and the electrically conductive first metal are different elements. In some embodiments, the density of the core-shell particulate, $Dp$, may be greater than or equal to $0.8De$ and less than or equal to $1.2De$ ($0.8De \leq Dp \leq 1.2De$), may be greater than or equal to $0.9De$ and less than or equal to $1.1De$ ($0.9De \leq Dp \leq 1.1De$), may be greater than or equal to $0.95De$ and less than or equal to $1.05De$ ($0.95De \leq Dp \leq 1.05De$) or may even be greater than or equal to $0.97De$ and less than or equal to $1.03De$ ($0.97De \leq Dp \leq 1.03De$). The density of the electrolyte, $De$, and core-shell particulate, $Dp$, can be determined by known techniques in the art.

In some embodiments, the electrically conductive first metal of the core-shell particulate is at least one of silver, copper, gold, aluminum, magnesium, molybdenum, iridium, tungsten, zinc, lead, cobalt, nickel, manganese, ruthenium, lithium, iron, tin, platinum, palladium, tantalum, chromium, antimony, vanadium, titanium, zirconium, bismuth, indium, gallium, and cerium. In some embodiments, the first redox active specie of the at least one redox active specie comprises a second metal. The second metal of the first redox active specie may be at least one of silver, copper, gold, aluminum, magnesium, iridium, zinc, lead, cobalt, nickel, manganese, ruthenium, lithium, iron, tin, platinum, palladium, chromium, antimony, vanadium, titanium, zirconium, bismuth, indium, and cerium. In some embodiments, the core-shell particulate includes at least one of a metallized ceramic particle, metallized ceramic bubble, metallized ceramic flake, metallized ceramic rod, metallized polymer particle, metallized polymer bubble, metallized polymer flake and metallized polymer rod. In some embodiments, the liquid medium of the electrolyte may be an aqueous liquid medium, while in other embodiments, the liquid medium of the electrolyte may be a non-aqueous liquid medium. In some embodiments, the electrolyte further comprises an at least partially soluble salt having a different chemical composition from that of the at least one redox active specie. In some embodiments, the first redox active specie of the at least one redox active specie and the electrically conductive first metal of the core-shell particulate each have a higher oxidation state and a lower oxidation state and the reduction potential of the first redox active specie in its higher oxidation state is less than the reduction potential of the electrically conductive first metal in its higher oxidation state. In some embodiments, the first redox active specie of the at least one redox active specie and the electrically conductive first metal of the core-shell particulate each have a higher oxidation state and a lower oxidation state and the reduction potential of the first redox active specie in its higher oxidation state is greater than the reduction potential of the electrically conductive first metal in its higher oxidation state. In some embodiments, the lower oxidation state of the first redox active specie may be zero, while in other embodiments, the lower oxidation state of the first redox active specie may be greater than zero. In some embodiments, the lower oxidation state of the first redox active specie and/or the electrically conductive first metal may be 0, 1+, 2+ or 3+. In some embodiments, the higher oxidation state of the first redox active specie and/or the electrically conductive first metal may be 1+, 2+, 3+, 4+ or 5+. In some embodiments, the core comprises at least one dielectric material. In some embodiment, the core comprises at least one of a polymer particle, a polymer bubble, polymer rod, a polymer flake, a ceramic particle, a ceramic bubble, ceramic rod and a ceramic flake. In some embodiments, the largest dimension of the core-shell particulate is from about 0.05 microns to about 1000 microns or even from about 0.05 microns to about 250 microns. The largest dimension of the core-shell particulate may be considered to be the length of the core-shell particulate.

Figure 2A:
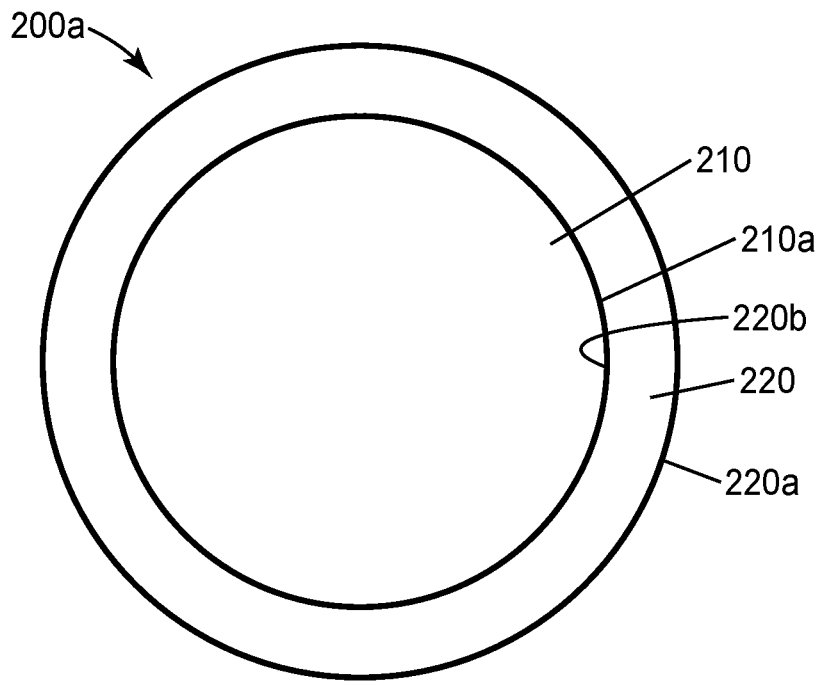
FIG. 2A shows a schematic cross-sectional view of an exemplary core-shell particulate according to one exemplary embodiment of the present disclosure.

In the present disclosure, the core-shell particulate includes a core, e.g. an interior portion, and a shell, e.g. an exterior portion. In some embodiments, the core of the core-shell particulate differs in at least one of chemical composition and morphology from that of the shell. In some embodiments, the core of the core-shell particulate differs in chemical composition from that of the shell. In some embodiments, the core of the core-shell particulate differs in morphology from that of the shell. In some embodiments, the core of the core-shell particulate differs in chemical composition and morphology from that of the shell. FIG. 2A shows a schematic cross-sectional view of an exemplary core-shell particulate 200a according to one exemplary embodiment of the present disclosure. Core-shell particulate 200a includes a core 210 with core exterior surface 210a and a shell 220 with exterior surface 220a and interior surface 220b. The outer most layer of the core-shell particulate is considered to be the shell of the core-shell particulate. The core of the particulate may be multiple layers, i.e. a multi-layer core.

Figure 2B:
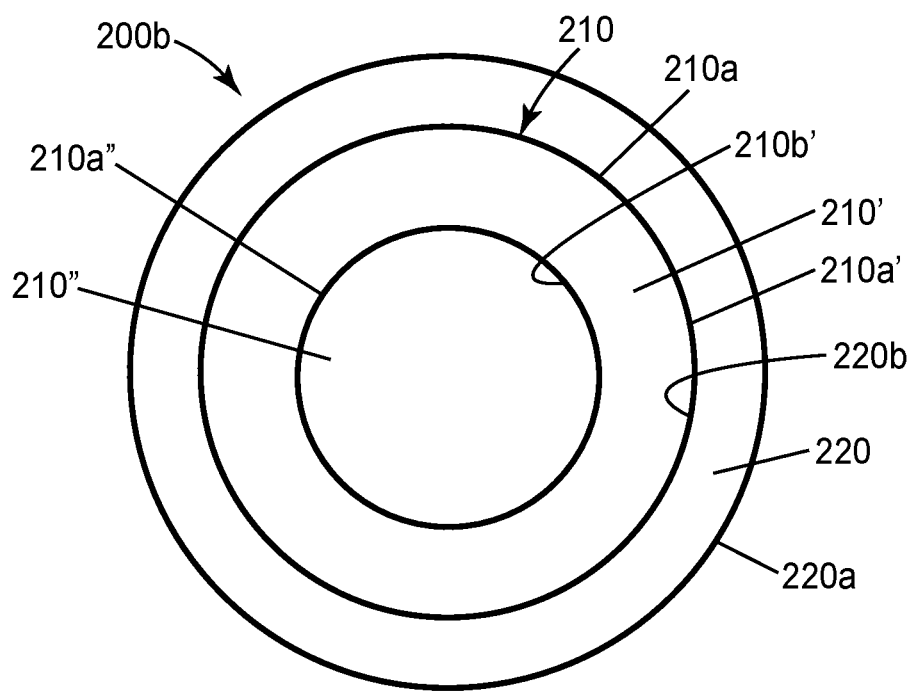
FIG. 2B shows a schematic cross-sectional view of an exemplary core-shell particulate according to one exemplary embodiment of the present disclosure.

FIG. 2B shows a schematic cross-sectional view of an exemplary core-shell particulate 200b according to one exemplary embodiment of the present disclosure. Core-shell particulate 200b includes a multi-layer core, e.g. a bi-layer core, 210 with an exterior surface 210a and a shell 220 with exterior surface 220a and interior surface 220b. Core 210 includes a first core layer 210' with core exterior surface 210a' and core interior surface 210b', and a second core layer 210" with core exterior surface 210a". The number of core layers in a multi-layer core is not particularly limited. The density of a multi-layer core may be measured directly or calculated based on the mass and volume of the materials comprising each layer of the core. In some embodiments, the multi-layer core includes at least two core layers, at least three core layers or even at least four core layers.

As shown in FIGS. 2A and 2B, shell 220 completely encapsulates core 210, e.g. shell 220 completely encapsulates core exterior surface 210a of core 210. However, this is not a requirement, as shell 220 may only partially encapsulate core 210, e.g. shell 220 may only partially encapsulates exterior surface 210a of core 210 (not shown in FIG. 2A). In some embodiments, at least about 50%, at least about 60%, at least about 70%, at least about 80%, at least about 90%, at least about 95% or even at least about 100% of core exterior surface 210a is encapsulated by shell 220. Generally, shell interior surface 220b will be in contact with core exterior surface 210a.

In some embodiments, core 210 may be a solid particulate, e.g. a solid ceramic particle or a solid polymer particle. If the core is a multi-layer core, each layer of the core may be a solid, e.g. a solid ceramic, a solid polymer or combination thereof, and the core may be a solid particulate. In some embodiment, the interior region of a core or a multi-layer core may be replaced by an engineered void. An engineered void is a void that is designed specifically to be present in a material. For example, second core layer 210" of FIG. 2B may be replaced by an engineered void, as would be found, for example, if core 210 was a ceramic bubble or polymer bubble. The engineered void may include a gas. In some embodiments, the core may also include a plurality of engineered voids, e.g. the core may be an open cell foam or closed cell foam. In some embodiments the engineered void volume of the core is less than about 95 volume percent, less than about 90 volume percent, less than about 80 volume percent, less than about 70 volume percent, less than about 60 volume percent, less than about 50 volume percent, less than about 40 volume percent, less than about 30 volume percent, less than about 25 volume percent, less than about 20 volume percent, less than about 15 volume percent, less than about 10 volume percent, less than about 5 volume percent or even less than about 3 volume percent. In some embodiments, the core is substantially free of engineered voids, i.e. the engineered void volume is about 0 volume percent. In this case, the core is considered a solid core. In some embodiments, the engineered void volume of the core-shell particulate is less than about 90 volume percent, less than about 80 volume percent, less than about 70 volume percent, less than about 60 volume percent, less than about 50 volume percent, less than about 40 volume percent, less than about 30 volume percent, less than about 25 volume percent, less than about 20 volume percent, less than about 15 volume percent, less than about 10 volume percent, less than about 5 volume percent or even less than about 3 volume percent. In some embodiments, the core-shell particulate is substantially free of engineered voids, i.e. the engineered void volume of the core-shell particulate is about 0 volume percent. In this case, the core-shell particulate is considered to be a solid core-shell particulate. In some embodiments, both the core and core-shell particulate may contain non-engineered voids, i.e. a minor volume fraction of voids associated with the fabrication of the core and core-shell particulate, but not purposely incorporated into the core or core-shell particulate. The void volume of the non-engineered voids in either the core or core-shell particulate may be less than about 5 volume percent, less than about 3 volume percent, less than about 1 volume percent, less than about 0.5 volume percent or even about 0 volume percent. A core or core-shell particulate that does not contain at least one engineered void is considered a solid particulate, e.g. a solid particle.

The shape of the core or core-shell particulate is not particularly limited. Particle shaped, e.g. spheroid and sphere, flake shaped, e.g. plate like, and rod shaped core-shell particulate may be beneficial to provide high surface areas while adjusting the viscosity of the electrode solution. Generally, the effect a core-shell particulate may have on the viscosity of a solution depends on its longest dimension, thus, the viscosity of the electrode solutions of the present disclosure may be modified based on the selection of the shape of the core-shell particulate.

Particle shaped particulates generally include particulates that have aspect ratios of length to width and length to thickness both of which are between about 1 and about 5. Sphere shaped particulates would have aspect ratios of length to width and length to thickness both of which are 1. Particles may be spheroidal in shape, including a sphere.

Flake shaped particulates generally include particulates that have a length and a width each of which is significantly greater than the thickness of the flake. A flake includes particulates that have aspect ratios of length to thickness and width to thickness each of which is greater than about 5. There is no particular upper limit on the length to thickness and width to thickness aspect ratios of a flake. Both the length to thickness and width to thickness aspect ratios of the flake may be between about 6 and about 1000, between about 6 and about 500, between about 6 and about 100, between about 6 and about 50, between about 6 and about 25, between about 10 and about 1000, between about 10 and about 500, between 10 and about 150, between 10 and about 100, or even between about 10 and about 50. Flakes may be platelet in shape.

Rod shaped particulates generally include particulates that have aspect ratios of the length to width and length to thickness both of which are greater about 5 and a width to thickness aspect ratio less than about 5 and greater than about 1. For a rod having a cross sectional area that is in the shape of a circle, the width and thickness would be the same and would be equal to the diameter of the circular cross-section. There is no particular upper limit on the length to width and length to thickness aspect ratios of a rod shaped particulate. Both the length to thickness and length to width aspect ratios of the rod may be between about 5 and about 500, between about 5 and about 250, between about 5 and about 100, between about 5 and about 50, between about 10 and about 500, between about 10 and about 250, between about 10 and about 100, between about 10 and about 50, between 20 and about 500, between 20 and about 250, between 20 and about 100 or even between about 20 and about 50. In some embodiments the thickness and width of the rod may be the same.

The dimension of the core-shell particulates are not particularly limited, except with respect to the dimension of liquid flow cells and liquid flow batteries they are to be used in. In some embodiments the largest dimension, e.g. length, of the core-shell particulate is from about 0.01 microns to about 2000 microns, from about 0.01 microns to about 1000 microns, from about 0.01 microns to about 750 microns, from about 0.01 microns to about 500 microns, from about 0.01 microns to about 250 microns, from about 0.01 microns to about 150 microns, from about 0.01 microns to about 100 microns, from about 0.05 microns to about 2000 microns, from about 0.05 microns to about 1000 microns, from about 0.05 microns to about 750 microns, from about 0.05 microns to about 500 microns, from about 0.05 microns to about 250 microns, from about 0.05 microns to about 150 microns, from about 0.05 microns to about 100 microns, from about 0.1 microns to about 2000 microns, from about 0.1 microns to about 1000 microns, from about 0.1 microns to about 750 microns, from about 0.1 microns to about 500 microns, from about 0.1 microns to about 250 microns, from about 0.1 microns to about 150 microns, from about 01 microns to about 100 microns, from about 0.5 microns to about 2000 microns, from about 0.5 microns to about 1000 microns, from about 0.5 microns to about 750 microns, from about 0.5 microns to about 500 microns, from about 0.5 microns to about 250 microns, from about 0.5 microns to about 150 microns, from about 0.5 microns to about 100 microns, from about 5 microns to about 2000 microns, from about 5 microns to about 1000 microns, from about 5 microns to about 750 microns, from about 5 microns to about 500 microns, from about 5 microns to about 250 microns, from about 5 microns to about 150 microns or even from about 5 microns to about 100 microns.

The particle size distribution of the core-shell particles is not particularly limited. In some embodiments, the particle size distribution is narrow, with most particles in the distribution having a similar size. Particles having a similar size may have a similar shell thickness. This may enable the particles to uniformly be stripped of the metal shell via oxidation reactions and/or uniformly plated with metal, via reduction reactions, which may improve cell and battery performance. One measure of the particle size distribution of a population of particles is the D90/D50 ratio. D50 is the diameter of the particle distribution where half, i.e. 50%, of the particles of the distribution lie below this value. D90 is the diameter of the particle distribution where 90 percent of the particles of the distribution lie below this value. In some embodiments, D90/D50 may be from about 1.0 to about 3.0, from about 1.0 to about 2.0, from about 1.0 to about 1.8, from about 1.0 to about 1.6, from about 1.0 to about 1.4, from about 1.0 to about 1.2, from about 1.05 to about 3.0, from about 1.05 to about 2.0, from about 1.05 to about 1.8, from about 1.05 to about 1.6, from about 1.05 to about 1.4, from about 1.05 to about 1.2, from about 1.1 to about 3.0, from about 1.1 to about 2.0, from about 1.1 to about 1.8, from about 1.1 to about 1.6, from about 1.1 to about 1.4 or even from about 1.1 to about 1.2. Particle size and particle size distribution, including values for D50 and D90, can be measured by techniques known in the art, for example light scattering.

The density of a core-shell particulate, $D_p$, is determined by the types and amounts of materials used for the core and shell, and whether or not it contains one or more engineered voids. In some embodiments, the density of the core-shell particulate is from about 0.3 $g/cm^3$ and about 2.0 $g/cm^3$, from about 0.6 $g/cm^3$ and about 2.0 $g/cm^3$, from about 0.65 $g/cm^3$ and about 2.0 $g/cm^3$, from about 0.70 $g/cm^3$ and about 2.0 $g/cm^3$, from about 0.75 $g/cm^3$ and about 2.0 $g/cm^3$, from about 0.80 $g/cm^3$ and about 2.0 $g/cm^3$, from about 0.85 $g/cm^3$ and about 2.0 $g/cm^3$, from about 0.90 $g/cm^3$ and about 2.0 $g/cm^3$, from about 0.3 $g/cm^3$ and about 1.8 $g/cm^3$, from about 0.6 $g/cm^3$ and about 1.8 $g/cm^3$, from about 0.65 $g/cm^3$ and about 1.8 $g/cm^3$, from about 0.70 $g/cm^3$ and about 1.8 $g/cm^3$, from about 0.75 $g/cm^3$ and about 1.8 $g/cm^3$, from about 0.80 $g/cm^3$ and about 1.8 $g/cm^3$, from about 0.85 $g/cm^3$ and about 1.8 $g/cm^3$, from about 0.90 $g/cm^3$ and about 1.8 $g/cm^3$, from about 0.3 $g/cm^3$ and about 1.6 $g/cm^3$, from about 0.6 $g/cm^3$ and about 1.6 $g/cm^3$, from about 0.65 $g/cm^3$ and about 1.6 $g/cm^3$, from about 0.70 $g/cm^3$ and about 1.6 $g/cm^3$, from about 0.75 $g/cm^3$ and about 1.6 $g/cm^3$, from about 0.80 $g/cm^3$ and about 1.6 $g/cm^3$, from about 0.85 $g/cm^3$ and about 1.6 $g/cm^3$, from about 0.90 $g/cm^3$ and about 1.6 $g/cm^3$, from about 0.3 $g/cm^3$ and about 1.4 $g/cm^3$, from about 0.6 $g/cm^3$ and about 1.4 $g/cm^3$, from about 0.65 $g/cm^3$ and about 1.4 $g/cm^3$, from about 0.70 $g/cm^3$ and about 1.4 $g/cm^3$, from about 0.75 $g/cm^3$ and about 1.4 $g/cm^3$, from about 0.80 $g/cm^3$ and about 1.4 $g/cm^3$, from about 0.85 $g/cm^3$ and about 1.4 $g/cm^3$, from about 0.90 $g/cm^3$ and about 1.4 $g/cm^3$, from about 0.3 $g/cm^3$ and about 1.2 $g/cm^3$, from about 0.6 $g/cm^3$ and about 1.2 $g/cm^3$, from about 0.65 $g/cm^3$ and about 1.2 $g/cm^3$, from about 0.70 $g/cm^3$ and about 1.2 $g/cm^3$, from about 0.75 $g/cm^3$ and about 1.2 $g/cm^3$, from about 0.80 $g/cm^3$ and about 1.2 $g/cm^3$, from about 0.85 $g/cm^3$ and about 1.2 $g/cm^3$ or even from about 0.90 $g/cm^3$ and about 1.2 $g/cm^3$.

The shell of the core-shell particulate includes an electrically conductive metal. In some embodiments, the shell of the core-shell particulate includes, but is not limited to, at least one of silver, copper, gold, aluminum, calcium, beryllium, magnesium, molybdenum, iridium, tungsten, zinc, lead, cobalt, nickel, manganese, ruthenium, lithium, iron, tin, platinum, palladium, tantalum, chromium, antimony, vanadium, titanium, zirconium, bismuth, indium, gallium, barium, cerium, cadmium and potassium. Combinations of metals may be used. The shell of the core-shell particulate may be a metal alloy. In some embodiments, the core shell particulate is an alloy of at least two of the disclosed metals.

The core of the core-shell particulate may include at least one of a metal, e.g. an electrically conductive metal, and a dielectric, e.g. a ceramic or polymer. In some embodiments, the core includes at least one of a ceramic and a polymer. Combinations of a metals may be used for the core, combinations dielectrics may be used for the core and combinations of metal(s) and dielectric(s) may be used for the core. The core may include metals previously disclosed for the shell of the core-shell particulate. In some embodiments, the core is substantially free of metal. By substantially free it is meant that the core contains, by weight, between about 0 percent and about 5 percent, between about 0 percent and about 3 percent, between about 0 percent and about 2 percent between about 0 percent and about 1 percent, between about 0 percent and about 0.5 percent or even between about 0 percent and about 0.1 percent of a metal.

The core may include a polymer. The core may include at least one of a thermoplastic and thermoset. The core may include polymers known in the art. The core may include, but is not limited to at least one of epoxy resin, phenolic resin, polyurethanes, urea-formaldehyde resin, melamine resin, polyesters, polyamides, polyethers, polycarbonates, polyimides, polysulphones, polyphenylene oxides, polyacrylates, polymethacrylates, polyolefin, e.g. polyethylene and polypropylene, styrene and styrene based random and block copolymers, e.g. styrene-butadiene-styrene, polyvinyl chloride, and fluorinated polymers, e.g. polyvinylidene fluoride, polytetrafluoroethylene. The core may include combinations of different polymers, e.g. a polymer composite and a polymer blend.

The core may include a ceramic. The ceramic may include, but is not limited to metal oxides; e.g. silicon oxide (glass and doped glass), aluminum oxide, zirconium oxide and titanium oxide; carbides, e.g. boron carbide and titanium carbide; and nitrides, e.g. boron nitride;

In some embodiments the core includes at least one of a ceramic particle, ceramic bubble, ceramic flake, ceramic rod, polymer particle, polymer bubble, polymer flake and polymer rod. In some embodiments, the core-shell particulate includes at least one of a metallized ceramic particle, metallized ceramic bubble, metallized ceramic flake, metallized ceramic rod, metallized polymer particle, metallized polymer bubble, metallized polymer flake and metallized polymer rod; combinations may be used. The metal used to metallize the core may include at least one of the previously disclosed electrically conductive metals described for the shell. Metallization of the core can be conducted by known techniques in the art including, but not limited to, electroplating, chemical vapor deposition, physical vapor deposition. One preferred method of metallizing a core is the use of physical vapor deposition including magnetron sputtering. Useful core-shell particulates and techniques for the fabrication of core-shell particulates are disclosed in, for example, U.S. Pat. Nos. 4,612,242 and 7,727,931, which are incorporated herein by reference in their entirety.

The amount of core-shell particulate in the electrode solution is not particularly limited. The amount of core-shell particulate in the electrode solution may be from about 5 percent to about 70 percent by volume, from about 5 percent to about 60 percent by volume, from about 5 percent to about 50 percent by volume, from about 5 percent to about 40 percent by volume, from about 5 percent to about 30 percent by volume, from about 10 percent to about 70 percent by volume, from about 10 percent to about 60 percent by volume, from about 10 percent to about 50 percent by volume, from about 10 percent to about 40 percent by volume, from about 10 percent to about 30 percent by volume, from about 15 percent to about 70 percent by volume, from about 15 percent to about 60 percent by volume, from about 15 percent to about 50 percent by volume, from about 15 percent to about 40 percent by volume, from about 15 percent to about 30 percent by volume, from about 20 percent to about 70 percent by volume, from about 20 percent to about 60 percent by volume, from about 20 percent to about 50 percent by volume, from about 20 percent to about 40 percent by volume or even from about 20 percent to about 30 percent by volume.

The electrolyte of the electrode solution includes a liquid medium and at least one redox active specie. The electrolyte of the electrode solution may include any electrolyte know in the art, particularly the art of liquid flow batteries, e.g. liquid redox flow batteries. The liquid medium of the electrolyte may be an aqueous liquid medium or a non-aqueous liquid medium. Solvents useful as a portion of an aqueous liquid medium or as a non-aqueous liquid medium or portion thereof include, but are not limited to, at least one of alcohol (e.g. methanol, ethanol, propanol, butanol, isobutyl alcohol), ether (e.g. crown ethers, THF, ethyl ether), ketone (e.g. acetone, methyl ethyl ketone, methyl n-propyl ketone, methyl isobutyl ketone, methyl isoamyl ketone), ester (e.g. ethyl acetate, n-butyl acetate), carbonate (e.g. propylene carbonate), nitrile (e.g. acetonitrile), amine (e.g. ethylene diamine, propyl amine), amide (e.g. dimethyl acetamide, methaneamide, n-methylformamide, n-ethylformamide, n, n-dimethylformamide, n, n-diethylformamide), sulfoxide (e.g. dimethyl sulfoxide), pyrrolidone (e.g. n-methyl-2-pyrrolidone), imidazolidone (e.g. 1,3-dimethyl-2-imidazolidinone), pyridine, halogenated solvent (e.g. dichloromethane, ethylene dichloride), organic acids (e.g. acetic acid) and inorganic acids, including mineral acids (e.g. sulfuric acid, nitric acid and phosphoric acid). Combinations of solvents may be used in the aqueous liquid medium and non-aqueous liquid medium. In some embodiments, an aqueous liquid medium includes at least 40% water by weight, at least 50 percent water by weight, at least 60 percent water by weight, at least 70 percent water by weight, at least 80 percent water by weight, at least 90 percent water by weight at least 95 percent water by weight, at least 99 percent water by weight or even 100 percent water by weight. In some embodiments, the non-aqueous liquid medium includes greater than 60 percent solvent by weight, greater than 70 percent solvent by weight, greater than 80 percent solvent by weight, greater than 90 percent solvent by weight, greater than 95 percent solvent by weight, greater than 99 percent solvent by weight or even about 100 percent solvent by weight.

The at least one redox active specie of the electrolyte may include any redox active specie known in the art, particularly the art of liquid flow batteries, e.g. liquid redox flow batteries. The at least one redox active specie may be organic or inorganic, inorganic being preferred. Redox reactive species can be classified by their standard reduction potentials. Standard reduction potentials for redox active species can be found in, for example, the "CRC Handbook of Chemistry and Physics", 96$^{th}$ Edition from CRC Press or "CRC Handbook of Chemistry and Physics", 76$^{th}$ Edition from CRC Press in their discussion of "Electrochemical Series". In some embodiments, the at least one redox active specie includes a metal, e.g. a second metal. In some embodiments, the second metal of the redox active specie is a transition metal. In some embodiments second metal of the redox active species is a transition metal with at least two positive oxidation states, e.g. copper which may be in either the 2+ or 3+ oxidation state. In some embodiments, the second metal of the first redox active specie may be at least one of silver, copper, gold, aluminum, magnesium, iridium, zinc, lead, cobalt, nickel, manganese, ruthenium, lithium, iron, tin, platinum, palladium, chromium, antimony, vanadium, titanium, zirconium, bismuth, indium, and cerium. The redox active species may initially be in the form of a salt. The salt being added to the liquid medium, which may in turn at least partially solubilize the salt and liberate the redox active species within the liquid medium as an ion. The salt which includes redox active species, when at least partially solubilized in the liquid medium, may form ions that increase the electrical conductivity of the liquid medium, thereby forming the electrolyte. In some embodiments, the redox active species is at least about 50 percent, at least about 60 percent, at least about 70, at least about 80 percent, at least about 90 percent, at least about 95 percent, at least about 98 percent or even 100 percent soluble, by weight, in the liquid medium.

The redox active specie may be those known in the art of redox flow battery chemistry. In some embodiments of the present disclosure, the at least one redox active specie may be, for example, associated with a vanadium redox flow battery (VRFB), wherein a $V^{3+}/V^{2+}$ sulfate solution serves as the negative electrolyte ("anolyte") and a $V^{5+}/V^{4+}$ sulfate solution serves as the positive electrolyte ("catholyte") and vanadium is the redox active specie. It is to be understood, however, that other redox chemistries are contemplated and within the scope of the present disclosure, including, but not limited to, $V^{2+}/V^{3+}$ vs. $Br^-/ClBr_2$, $Br_2/Br^-$ vs. $S/S^{2-}$, $Br^-/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$ and $Cr^{3+}/Cr^{2+}$, acidic/basic chemistries. Other chemistries and associated redox active species useful in liquid flow batteries include coordination chemistries, for example, those disclosed in U.S. Pat. Publ. Nos. 2014/0028260, 2014/0099569, and 2014/0193687 and organic complexes, for example, U.S. Pat. Publ. No. 2014/370403 and international application published under the patent cooperation treaty Int. Publ. No. WO 2014/052682, all of which are incorporated herein by reference in their entirety.

The concentration of the at least one redox active specie in the electrolyte is not particularly limited. The concentration of the at least one redox active specie in the electrolyte may be from about 0.05 mole/liter (M) to about 5 M, from about 0.05 M to about 4 M, from about 0.05 M to about 3, from about 0.05 M to about 2 M, from about 0.05 M to about 1 M, from about 0.1 M to about 5 M, from about 0.1 M to about 4 M, from about 0.1 M to about 3, from about 0.1 M to about 2 M, from about 0.1 M to about 1 M, from about 0.2 M to about 5 M, from about 0.2 M to about 4 M, from about 0.2 M to about 3 M, from about 0.2 M to about 2 M, from about 0.2 M to about 1 M, from about 0.5 M to about 5 M, from about 0.5 M to about 4 M, from about 0.5 M to about 3, from about 0.5 M to about 2 M or even from about 0.5 M to about 1 M.

The concentration of the at least one redox active specie in the electrode solution is not particularly limited. The concentration of the at least one redox active specie in the electrode solution may be from about 0.02 M to about 5 M, from about 0.02 M to about 4 M, from about 0.02 M to about 3, from about 0.02 M to about 2 M, from about 0.02 M to about 1 M, from about 0.05 M to about 5 M, from about 0.05 M to about 4 M, from about 0.05 M to about 3, from about 0.05 M to about 2 M, from about 0.05 M to about 1 M, from about 0.1 M to about 5 M, from about 0.1 M to about 4 M, from about 0.1 M to about 3, from about 0.1 M to about 2 M, from about 0.1 M to about 1 M, from about 0.2 M to about 5 M, from about 0.2 M to about 4 M, from about 0.2 M to about 3, from about 0.2 M to about 2 M, from about 0.2 M to about 1 M, from about 0.5 M to about 5 M, from about 0.5 M to about 4 M, from about 0.5 M to about 3, from about 0.5 M to about 2 M or even from about 0.5 M to about 1 M.

The electrolyte may further contain an at least partially soluble salt wherein the salt does not include the at least one redox active species. The salt will typical include ionic species that increase the electrical conductivity of the electrolyte, once the ionic species are solubilized in the liquid medium of the electrolyte. However, the components of the salt may not be redox active, relative to the at least one redox active specie of the electrolyte, or may have lower redox activity than the at least one redox active specie of the electrolyte. The redox activity of the ionic components of the salt relative to the at least one redox active species can be determined from their corresponding standard reduction potentials and whether they are to be part of the anode half-cell or cathode half-cell.

The electrolyte may contain other additive known in the art including, but not limited to, viscosity modifiers, particle stabilizers, surfactants, chelating agents, mediators and combinations thereof.

In some embodiments, the electrolyte is substantially free of insoluble compounds, excluding the core-shell particulates. Insoluble compounds may purposely be added or may be inadvertently added to the electrolyte via impurities in any of the components which are used to manufacture the electrolyte. Various filtration techniques known in the art may be able to remove a large fraction of the insoluble compounds, for example, greater than 70 percent by weight, greater than 80 percent by weight, greater than 90 percent by weight, greater than 95 percent by weight or even greater than 98 percent by weight of the insoluble compounds may be removed by filtration. The phrase "substantially free of insoluble compounds" means that the electrolyte contains less than about 20 percent by weight, less than about 10 percent by weight, less than about 5 percent by weight, less than about 3 percent by weight, less than about 1 percent by weight, less than about 0.5 percent by weight or even less than about 0.1 percent by weight insoluble compounds, excluding the core-shell particulate.

The density of the electrolyte, De, is not particularly limited. In some embodiments, the density of the electrolyte is from about 0.6 g/cm$^3$ and about 2.0 g/cm$^3$, from about 0.65 g/cm$^3$ and about 2.0 g/cm$^3$, from about 0.70 g/cm$^3$ and about 2.0 g/cm$^3$, from about 0.75 g/cm$^3$ and about 2.0 g/cm$^3$, from about 0.80 g/cm$^3$ and about 2.0 g/cm$^3$, from about 0.85 g/cm$^3$ and about 2.0 g/cm$^3$, from about 0.90 g/cm$^3$ and about 2.0 g/cm$^3$, from about 0.6 g/cm$^3$ and about 1.8 g/cm$^3$, from about 0.65 g/cm$^3$ and about 1.8 g/cm$^3$, from about 0.70 g/cm$^3$ and about 1.8 g/cm$^3$, from about 0.75 g/cm$^3$ and about 1.8 g/cm$^3$, from about 0.80 g/cm$^3$ and about 1.8 g/cm$^3$, from about 0.85 g/cm$^3$ and about 1.8 g/cm$^3$, from about 0.90 g/cm$^3$ and about 1.8 g/cm$^3$, from about 0.6 g/cm$^3$ and about 1.6 g/cm$^3$, from about 0.65 g/cm$^3$ and about 1.6 g/cm$^3$, from about 0.70 g/cm³ and about 1.6 g/cm³, from about 0.75 g/cm³ and about 1.6 g/cm³, from about 0.80 g/cm³ and about 1.6 g/cm³, from about 0.85 g/cm³ and about 1.6 g/cm³, from about 0.90 g/cm³ and about 1.6 g/cm³, from about 0.6 g/cm³ and about 1.4 g/cm³, from about 0.65 g/cm³ and about 1.4 g/cm³, from about 0.70 g/cm³ and about 1.4 g/cm³, from about 0.75 g/cm³ and about 1.4 g/cm³, from about 0.80 g/cm³ and about 1.4 g/cm³, from about 0.85 g/cm³ and about 1.4 g/cm³, from about 0.90 g/cm³ and about 1.4 g/cm³, from about 0.6 g/cm³ and about 1.2 g/cm³, from about 0.65 g/cm³ and about 1.2 g/cm³, from about 0.70 g/cm³ and about 1.2 g/cm³, from about 0.75 g/cm³ and about 1.2 g/cm³, from about 0.80 g/cm³ and about 1.2 g/cm³, from about 0.85 g/cm³ and about 1.2 g/cm³ or even from about 0.90 g/cm³ and about 1.2 g/cm³.

The electrode solutions of the present disclosure can be prepared by adding the at least one redox active species and the core-shell particulate to the liquid medium and mixing the solution using conventional mixing and/or dispersion techniques known in the art. The order of addition of the at least one redox active specie and the core-shell particulate to the liquid medium is not particularly limited. In some embodiments the at least one redox active species is added to the liquid medium, the liquid medium is mixed, followed by addition of the core-shell particulate to the liquid medium, followed by additional mixing. In some embodiments the core-shell particulate is added to the liquid medium, the liquid medium is mixed, followed by addition of the at least one redox active species to the liquid medium, followed by additional mixing. In some embodiments, the core-shell particulate and the at least one redox active species are added to the liquid medium and the liquid medium is mixed. Additional additives may be added to the liquid medium at any point in the preparation process of the electrode solution, followed by mixing. In some embodiments, the additional additives may be added and mixed into the liquid medium prior to the addition of the core-shell particulate to the liquid medium.

As previously discussed, improvement in the dispersion and/or dispersion stability of the core-shell particulate within the electrode solution may be obtained by engineering the density of the core-shell particulate, Dp, and/or that density of the electrolyte, De, to be similar or the same. This may be accomplished through the selection of the types and amounts of materials used for the core and shell of the core-shell particulate and/or through the selection of the types and amounts of materials used for the electrolyte. In some embodiments, the core-shell particulate includes a core having a density of less than about 2.0 g/cm³ and a shell that includes an electrically conductive first metal having a density of greater than about 2.5 g/cm³. In some embodiments the density of the core may be from about 0.02 g/cm³ to about 2.0 g/cm³, from about 0.02 g/cm³ to about 1.75 g/cm³, from about 0.02 g/cm³ to about 1.5 g/cm³, from about 0.02 g/cm³ to about 1.25 g/cm³, from about 0.04 g/cm³ to about 2.0 g/cm³, from about 0.04 g/cm³ to about 1.75 g/cm³, from about 0.04 g/cm³ to about 1.5 g/cm³, from about 0.04 g/cm³ to about 1.25 g/cm³, from about 0.1 g/cm³ to about 2.0 g/cm³, from about 0.1 g/cm³ to about 1.75 g/cm³, from about 0.1 g/cm³ to about 1.5 g/cm³, from about 0.1 g/cm³ to about 1.25 g/cm³, from about 0.2 g/cm³ to about 2.0 g/cm³, from about 0.2 g/cm³ to about 1.75 g/cm³, from about 0.2 g/cm³ to about 1.5 g/cm³, from about 0.2 g/cm³ to about 1.25 g/cm³, from about 0.4 g/cm³ to about 2.0 g/cm³, from about 0.4 g/cm³ to about 1.75 g/cm³, from about 0.4 g/cm³ to about 1.5 g/cm³, from about 0.4 g/cm³ to about 1.25 g/cm³, from about 0.6 g/cm³ to about 2.0 g/cm³, from about 0.6 g/cm³ to about 1.75 g/cm³, from about 0.6 g/cm³ to about 1.5 g/cm³ or even from about 0.6 g/cm³ to about 1.25 g/cm³ and the density of the shell may be from about 2.5 g/cm³ to about 24 g/cm³, from about 2.5 g/cm³ to about 20 g/cm³, from about 2.5 g/cm³ to about 16 g/cm³, from about 2.5 g/cm³ to about 12 g/cm³, from about 4.0 g/cm³ to about 24 g/cm³, from about 4.0 g/cm³ to about 20 g/cm³, from about 4.0 g/cm³ to about 16 g/cm³, from about 4.0 g/cm³ to about 12 g/cm³, from about 5.5 g/cm³ to about 24 g/cm³, from about 5.5 g/cm³ to about 20 g/cm³, from about 5.5 g/cm³ to about 16 g/cm³ or even from about 5.5 g/cm³ to about 12 g/cm³.

In addition to matching the density of the core-shell particulate to that of the density of the electrolyte to improve the dispersion and/or dispersion stability of the core-shell particulate within the electrode solution, in some embodiments, the viscosity of the electrolyte and/or viscosity of the electrode solution may also be selected to improve the dispersion and/or dispersion stability of the core-shell particulate within the electrode solution. A higher viscosity may improve the dispersion and/or dispersion stability of the core-shell particulate within the electrolyte and/or electrode solution. Additionally, the electrolyte and/or electrode solution may be thixotropic. The viscosity of a thixotropic solution increases under low shear rates or low shear conditions and increases under high shear rates or this shear conditions. This would be desirable in an electrode solution, as in regions of low shear, e.g. within the anolyte and catholyte storage tanks, the shear rates would be lower, and the viscosity of the electrode solution would subsequently increase and the dispersion stability of the core-shell particulates would also increase. In high shear regions, e.g. within a flow channel of a flow plate, the shear rates would be high and the viscosity of the electrode solution would be lower, improving flow rates, while the high shear rates would help maintain dispersion of the core-shell particulates in the electrode solution.

The present disclosure also provides electrochemical cells, e.g. liquid flow cells which may also be referred to as liquid flow electrochemical cells, and liquid flow batteries. The liquid flow batteries may include one or more electrochemical cells, e.g. liquid flow cells. Each electrochemical cell of the liquid flow battery includes an anode half-cell and a cathode half-cell. The present disclosure provides an electrochemical cell used, for example, in a battery, e.g. a liquid flow battery, the electrochemical cell may include a first electrode solution according to any one of the electrode solutions of the present disclosure, an anode half-cell and a cathode half-cell, wherein at least one of the anode half-cell and cathode half-cell does not contain a stationary porous electrode and the first electrode solution is contained in the half-cell that does not contain a stationary porous electrode. In some embodiments, both the anode half-cell and cathode-half cell do not contain a stationary porous electrode.

In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode.

In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the first electrode solution is contained in the cathode half-cell and the cathode half-cell does not contain a stationary porous electrode.

In another embodiment, the present disclosure provides an electrochemical cell comprising a first electrode solution according to any one of the electrode solutions of the present disclosure, an anode half-cell and a cathode half-cell, wherein at least one of the anode half-cell and cathode half-cell does not contain a stationary porous electrode and the first electrode solution is contained in the half-cell that does not contain a stationary porous electrode. In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode. The electrochemical cell may further comprises a second electrode solution according to any one of the electrode solutions of the present disclosure, wherein the first redox active specie of the at least one redox active specie and the electrically conductive first metal of the core-shell particulate, of the second electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the second electrode solution is contained in the cathode half-cell and the cathode half-cell does not contain a stationary porous electrode.

In yet another embodiment, the present disclosure provides an electrochemical cell comprising a first electrode solution according to any one of the electrode solutions of the present disclosure, an anode half-cell and a cathode half-cell, wherein at least one of the anode half-cell and cathode half-cell does not contain a stationary porous electrode and the first electrode solution is contained in the half-cell that does not contain a stationary porous electrode, wherein the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the first electrode solution is contained in the cathode half-cell and the cathode half-cell does not contain a stationary porous electrode The electrochemical cell may include an ion permeable membrane, wherein the ion permeable membrane separates a first electrode solution from an electrolyte. The electrochemical cell may include an ion permeable membrane disposed between the anode half-cell and cathode half-cell. In some embodiments, the ion permeable membrane is an ion exchange membrane. The electrochemical cell may include an anode flow plate and a first current collector, wherein the anode flow plate is in electrical communication with the first current collector and the first electrode solution; and/or a cathode flow plate and a second current collector, wherein the cathode flow plate is in electrical communication with the first current collector and the second electrode solution. In some embodiments, the electrochemical cell does not contain a stationary porous electrode. In some embodiments, a stationary porous electrode has a first major surface and opposed second major surface and at least one of the first major surface and second major surface has an area of at least about 1 $cm^2$, at least about 2 $cm^2$, at least about 5 $cm^2$, at least about 10 $cm^2$ or even at least about 100 $cm^2$.

Figure 3:
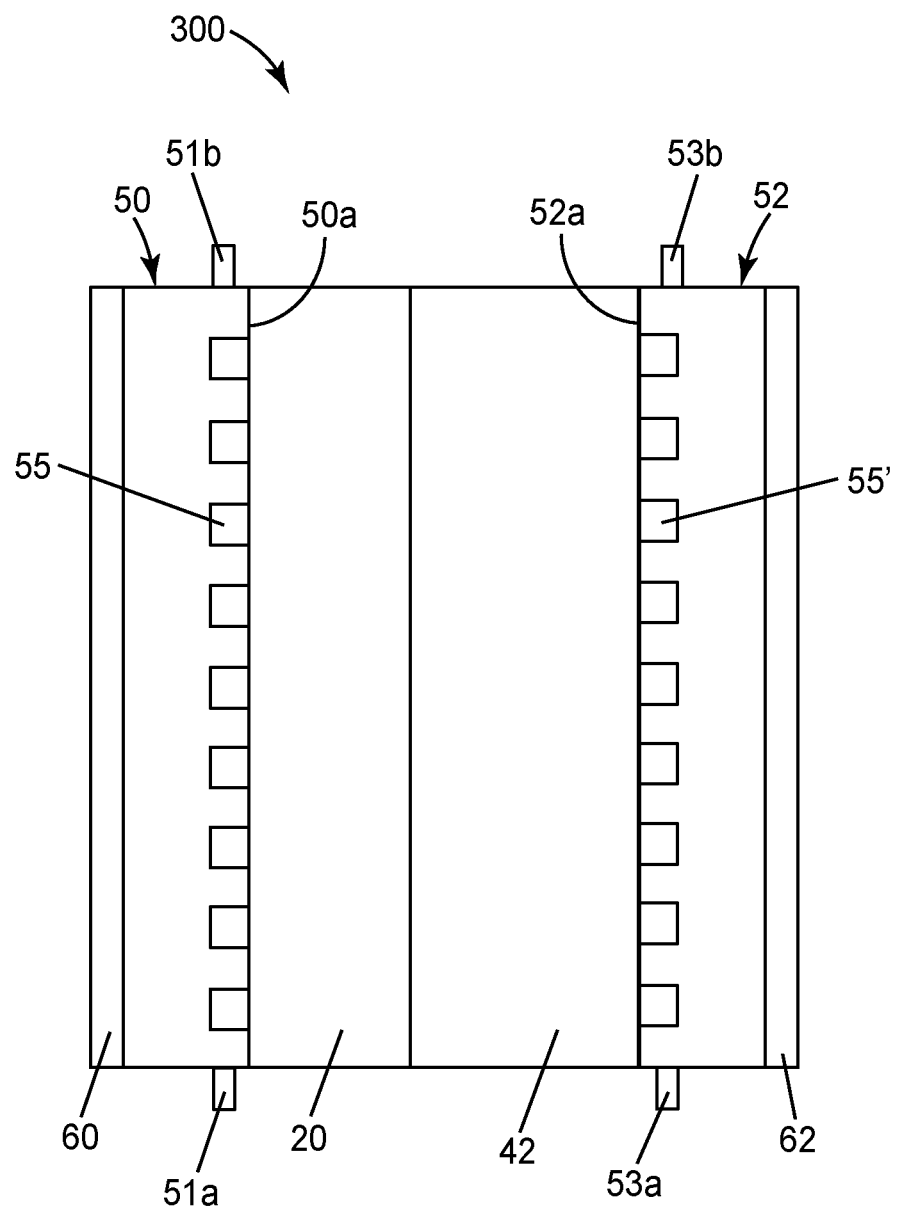
FIG. 3 shows a schematic cross-sectional view of an exemplary electrochemical cell according to one exemplary embodiment of the present disclosure.

FIG. 3 shows a schematic cross-sectional view of an exemplary electrochemical cell 300 according to one exemplary embodiment of the present disclosure which may be used in the fabrication of a liquid flow battery (e.g. a redox flow battery). Electrochemical cell 300 includes stationary porous electrode 42 (a cathode); an ion permeable membrane 20 disposed between the anode and cathode half-cells, providing electrical insulation between the half-cells and providing a path for one or more select ionic species to pass between the anode and cathode half-cells; anode and cathode flow plates 50, 52, the former positioned adjacent the ion permeable membrane 20 and the later positioned adjacent stationary porous electrode 42, each containing one or more flow channels 55, 55' which allow a first electrode solution and catholyte solution, to enter the anode and cathode flow plates, respectively. The anode and cathode flow plates include fluid inlet ports 51*a*, 53*a* and fluid outlet ports 51*b*, 53*b* respectively. The electrochemical cell also include two current collectors 60, 62, one adjacent to and in contact with the exterior surface of the anode flow plate 50, e.g. a monopolar anode flow plate, and one adjacent to and in contact with the exterior surface of the cathode flow plate 50', e.g. a monopolar cathode flow plate. The current collectors allow electrons generated during cell discharge to connect to an external circuit or load and do useful work. Anode and cathode flow plates 50 and 52 include first surfaces 50*a* and 52*a*, respectively. At least portions of surfaces 50*a* and 52*a* are in electrical communication with the anode (core-shell particulate) of the first electrode solution and stationary porous electrode 42 (cathode), respectively. Surfaces 50*a* and 52*a* include the surfaces defining flow channels 55 and 55', respectively. Anode and cathode flow plates 50 and 52 are also in electrical communication with current collectors 60 and 62, respectively. This electrochemical cell, includes a first electrode solution (not shown), which contains a core-shell particulate that functions as an anode, which may be pumped into and through flow channels 55 of anode flow plate 50 via fluid ports 51*a* and 51*b*. The electrochemical cell may also include a conventional catholyte (not shown) which may be pumped into and through flow channels 55' of cathode flow plate 52 via fluid ports 53*a* and 53*b*. The electrode solution also contains at least one redox active species, the at least one redox active specie will be oxidized at the surface of the electrically conductive core-shell particulate, which is functioning as the anode in the anode half-cell. Excess electrons associated with the electrically conductive core-shell particulate are then conducted to the current collector 60 via the anode flow plate 50. This current will then follow conductive path (not shown), which may include an electrical load, to the current collector 62 and be conducted to the cathode 42 via the cathode flow plate 52. The electrons of the cathode may then reduce redox active species in the catholyte. In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode.

In the exemplary electrochemical cell of FIG. 3, the anode half-cell may include flow plate 50 containing the electrode solution (not shown) which functions as an anode; and the cathode half-cell may include flow plate 52 containing a conventional catholyte (not shown) and stationary porous electrode 42. A conventional catholyte may not contain an electrically conductive core-shell particulate.

In some embodiments, in cell stacks that include more than one cell, the interior anode and cathode flow plates may be bipolar plates, with the anode and cathode end plates, i.e. the two plates at the exterior of the cell stack, being monopolar plates.

Figure 4:
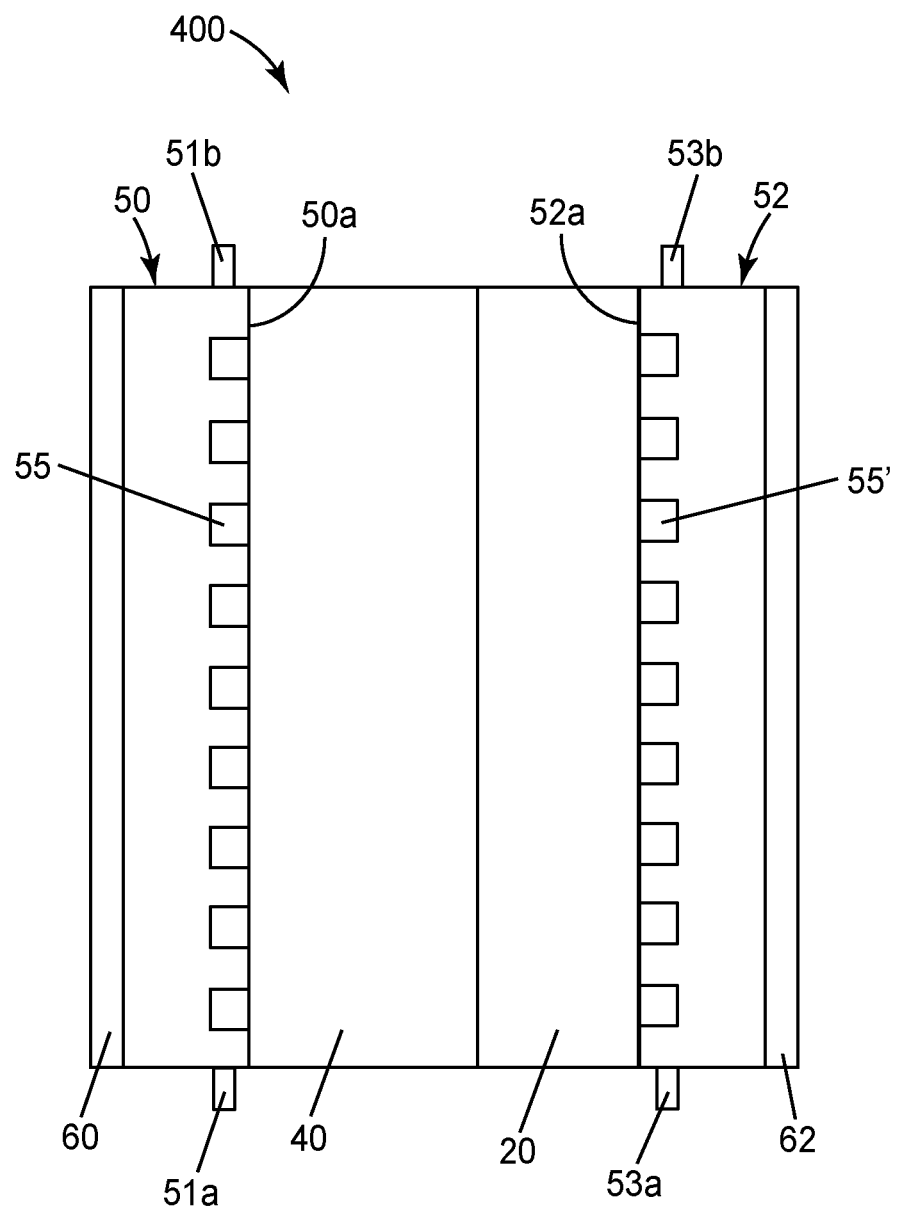
FIG. 4 shows a schematic cross-sectional view of an exemplary electrochemical cell according to one exemplary embodiment of the present disclosure.

FIG. 4 shows a schematic cross-sectional view of an exemplary electrochemical cell 400, according to one exemplary embodiment of the present disclosure, which may be used in the fabrication of a liquid flow battery (e.g. a redox flow battery). Electrochemical cell 400 includes stationary porous electrode 40 (an anode); an ion permeable membrane 20 disposed between the anode and cathode half-cells, providing electrical insulation between the half-cells and providing a path for one or more select ionic species to pass between the anode and cathode half-cells; anode and cathode flow plates 50, 52, the latter positioned adjacent the ion permeable membrane 20 and the former positioned adjacent stationary porous electrode 40, each containing one or more flow channels 55, 55' which allow an anolyte solution and a first electrode solution, to enter the anode and cathode flow plates, respectively. The anode and cathode flow plates include fluid inlet ports 51a, 53a and fluid outlet ports 51b, 53b respectively. The electrochemical cell also include two current collectors 60, 62, one adjacent to and in contact with the exterior surface of the anode flow plate 50, e.g. a monopolar anode flow plate, and one adjacent to and in contact with the exterior surface of the cathode flow plate 50', e.g. a monopolar cathode flow plate. The current collectors allow electrons generated during cell discharge to connect to an external circuit or load and do useful work. Anode and cathode flow plates 50 and 52 include first surfaces 50a and 52a, respectively. At least portions of surfaces 50a and 52a are in electrical communication with the stationary porous electrode 40 (anode) and the cathode (core-shell particulate) of the first electrode solution, respectively. Surfaces 50a and 52a include the surfaces defining flow channels 55 and 55', respectively. Anode and cathode flow plates 50 and 52 are also in electrical communication with current collectors 60 and 62, respectively. In cell stacks that include more than one cell, interior anode and cathode flow plates may be bipolar plates, with the anode and cathode end plates, i.e. the two plates at the exterior of the cell stack, being monopolar plates. This exemplary electrochemical cell includes a first electrode solution (not shown), which contains a core-shell particulate that functions as cathode, which may be pumped into and through flow channels 55' of cathode flow plate 52 via fluid ports 53a and 53b. The electrochemical cell may also include a conventional anolyte (not shown) which may be pumped into and through flow channels 55 of anode flow plate 50 via fluid ports 51a and 51b. The electrode solution also contains at least one redox active species, the at least one redox active specie will be reduced at the surface of the electrically conductive core-shell particulate, which is functioning as the cathode in the cathode half-cell. Excess electrons associated with the anode, formed via oxidation of a redox active specie in the anolyte are then conducted to the current collector 60 via the anode flow plate 50. This current will then follow conductive path (not shown), which may include an electrical load, to the current collector 62 and be conducted to the cathode of the electrode solution (core-shell particulate) via the cathode flow plate 52. The excess electrons of the cathode may then reduce redox active species in the electrode solution. In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the first electrode solution is contained in the cathode half-cell and the cathode half-cell does not contain a stationary porous electrode. In some embodiments, in cell stacks that include more than one cell, interior anode and cathode flow plates may be bipolar plates, with the anode and cathode end plates, i.e. the two plates at the exterior of the cell stack, being monopolar plates.

In the exemplary electrochemical cell of FIG. 4, the anode half-cell may include flow plate 50 containing a conventional anolyte (not shown) and stationary porous electrode 40; and the cathode half-cell may include flow plate 52 containing the electrode solution (not shown) which functions as a cathode. A conventional anolyte may not contain an electrically conductive core-shell particulate.

Figure 5:
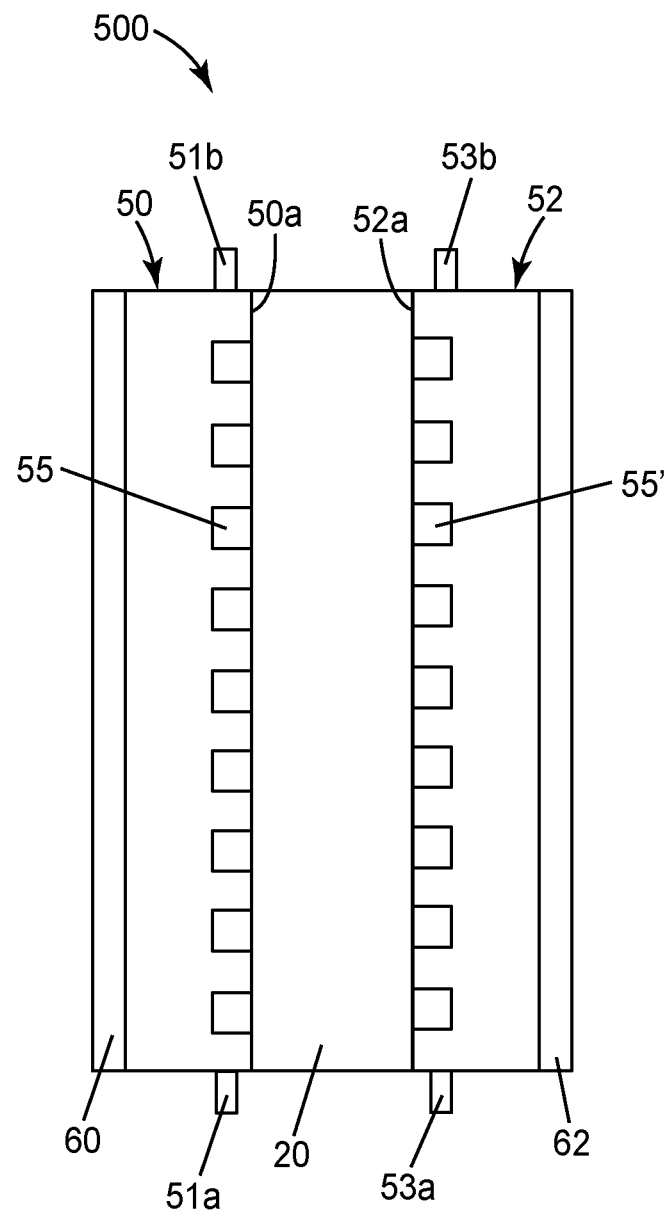
FIG. 5 shows a schematic cross-sectional view of an exemplary electrochemical cell according to one exemplary embodiment of the present disclosure.

FIG. 5 shows a schematic cross-sectional view of an exemplary electrochemical cell 500, according to one exemplary embodiment of the present disclosure, which may be used in the fabrication of a liquid flow battery (e.g. a redox flow battery). Electrochemical cell 500 includes anode and cathode flow plates 50 and 52, each containing one or more flow channels 55, 55', respectively, and each having first surfaces 50a and 52a, respectively. The anode and cathode flow plates include fluid inlet ports 51a, 53a and fluid outlet ports 51b, 53b respectively. Anode and cathode flow plates 50 and 52 are also in electrical communication with current collectors 60 and 62, respectively. Electrochemical cell 500 also includes a first electrode solution (not shown), which contains a core-shell particulate that functions as an anode, which may be pumped into and through flow channels 55 of anode flow plate 50 via fluid ports 51a and 51b; and a second electrode solution (not shown), which contains a core-shell particulate that functions as cathode, which may be pumped into and through flow channels 55' of cathode flow plate 52 via fluid ports 53a and 53b. At least portions of surfaces 50a and 52a are in electrical communication with the anode (core-shell particulate) of the first electrode solution and cathode (core-shell particulate) of the second electrode solution, respectively. Surfaces 50a and 52a include the surfaces defining flow channels 55 and 55', respectively. The anode half-cell may include anode flow plate 50 and the first electrode solution contained therein and the cathode half-cell may include cathode flow plate 52 and the second electrode solution contained therein. Electrochemical cell 500 also includes ion permeable membrane 20 disposed between the anode and cathode half-cells, i.e. disposed between the anode flow plate 50 and cathode flow plate 52. In some embodiments, in cell stacks that include more than one cell, interior anode and cathode flow plates may be bipolar plates, with the anode and cathode end plates, i.e. the two plates at the exterior of the cell stack, being monopolar plates.

Exemplary electrochemical cell 500 includes a first electrode solution (not shown), which contains a core-shell particulate that functions as anode, which may be pumped into and through flow channels 55 of anode flow plate 50 via fluid ports 51*a* and 51*b*, and a second electrode solution (not shown), which may be pumped into and through flow channels 55' of cathode flow plate 52 via fluid ports 53*a* and 53*b*. Each electrode solution also contains at least one redox active species, the redox active specie of the first solution will be oxidized at the surface of the electrically conductive core-shell particulate, which is functioning as the anode in the anode half-cell, and the redox active specie of the second electrode solution will be reduced at the surface of the electrically conductive core-shell particulate, which is functioning as the cathode in the cathode half-cell. Excess electrons associated with the anode (the electrically conductive core-shell particulate of the first electrode solution), formed via oxidation of the redox active specie in the first electrode solution, are then conducted to the current collector 60 via the anode flow plate 50. This current will then follow conductive path (not shown), which may include an electrical load, to current collector 62 and be conducted to the cathode (electrically conductive core-shell particulate of the second electrode solution) via the cathode flow plate 52. The excess electrons of the cathode may then reduce the redox active species of the second electrode solution.

In some embodiments, the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode; and the first redox active specie of the at least one redox active specie and the electrically conductive first metal of the core-shell particulate, of the second electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the second electrode solution is contained in the cathode half-cell and the cathode half-cell does not contain a stationary porous electrode.

Figure 6:
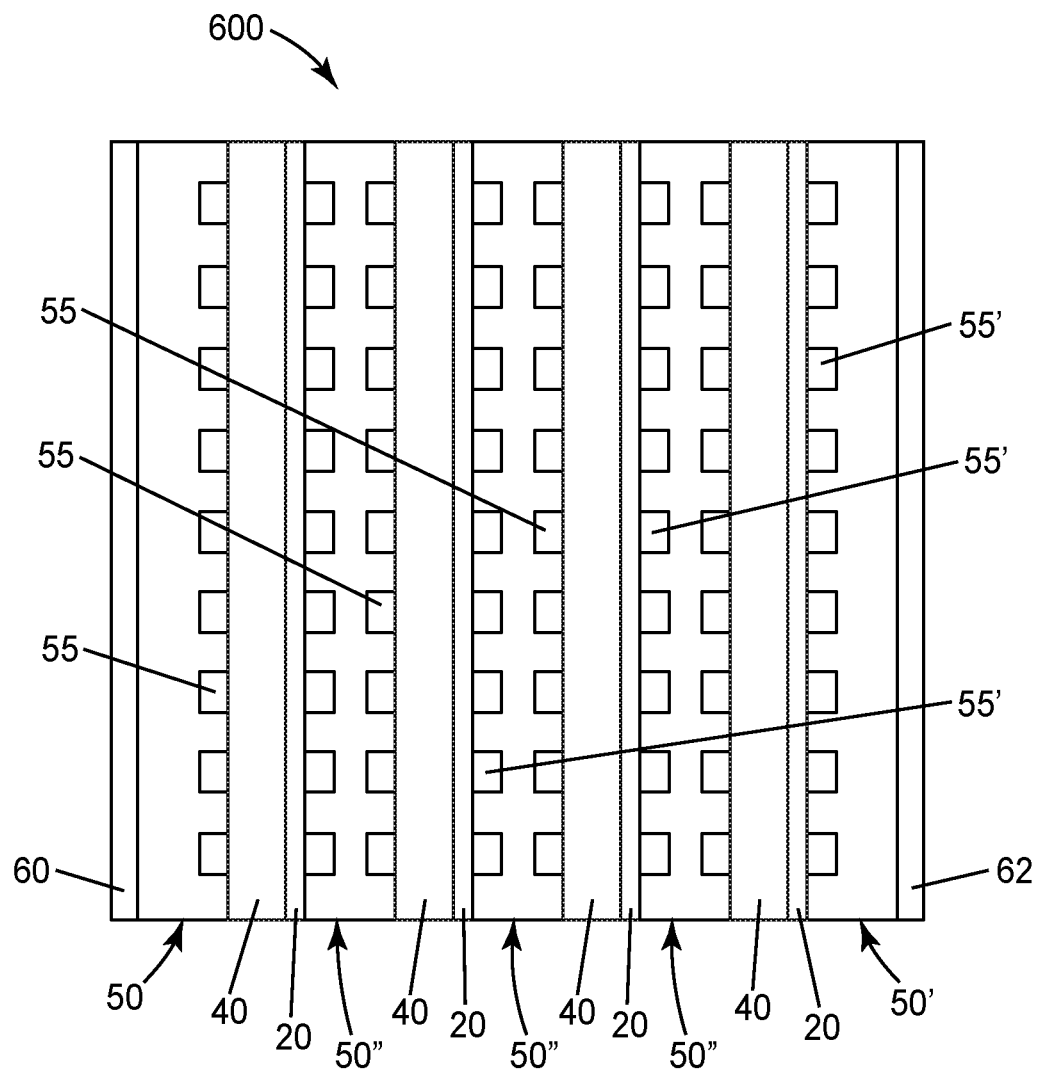
FIG. 6 is a schematic cross-sectional side view of an exemplary electrochemical cell stack according to one exemplary embodiment of the present disclosure.

In some embodiments, a redox flow battery may include a plurality of electrochemical cells (which form an electrochemical cell stack) according to any of the electrochemical cells of the present disclosure. As previously discussed, in cell stacks that include more than one electrochemical cell, interior anode and cathode flow plates (flow plates in the interior of the cell stack) may be bipolar flow plates, with the anode and cathode end plates, i.e. the two plates at the exterior of the cell stack, being monopolar plates. The plurality of electrochemical cells may have the same anode half-cell and cathode half-cell design, e.g. any one of the embodiments as shown in any one of FIGS. 3-5. In some embodiments, the anode half-cell and cathode half-cell design may differ between electrochemical cells, e.g. combinations of the embodiments shown in FIGS. 3-5 may be used for the plurality of electrochemical cells. FIG. 6 is a schematic cross-sectional side view of an exemplary electrochemical cell stack 600 according to one exemplary embodiment of the present disclosure. Electrochemical cell stack 600 includes bipolar plates 50" and end plates 50 and 50' each having flow channels 55 and 55'. Bipolar plates 50" allow a conventional anolyte or an electrode solution which has electrically conductive core-shell particulate anode to flow through one set of channels, 55 and a conventional catholyte or an electrode solution which has electrically conductive core-shell particulate cathode which can to flow through a seconds set of channels, 55', for example. The exemplary electrochemical cell stack 600 includes multiple electrochemical cells each having a design similar to the single electrochemical cell described in FIG. 4, with minor changes in the anode and cathode flow plate design for interior cells, e.g. the monopolar anode and cathode flow plates are replaced by bipolar flow plates. Each electrochemical interior cell includes anode and cathode half-cells, including two halves of two adjacent by polar plates, 50". The anode half-cell includes the portion of a bipolar plate with flow channels 55 and the cathode half-cell includes a portion of an adjacent bipolar plate with flow channels 55'. The electrochemical cell, the anode half-cell, may include a conventional anolyte (not shown) which may be pumped into and through flow channels 55 of bipolar flow plate 50" via fluid inlet and outlet ports (not shown) and a stationary porous electrode 40. The electrochemical cell, the cathode half-cell, may include a first electrode solution (not shown), which contains a core-shell particulate that functions as cathode, which may be pumped into and through flow channels 55' of bipolar flow plate 52 via fluid inlet and out let ports (not shown). The electrochemical cell may include an ion permeable membrane 20 disposed between the anode and cathode half-cells, the ion permeable membrane 20 being adjacent the bipolar plate 50" and the stationary porous electrode 40. The exterior electrochemical cells of the cell stack each include a monopolar plate, 50 and 50' (which replaces the corresponding half of the bipolar plate of an interior cell) and corresponding current collectors 60 and 62, respectively. The electrochemical cells of FIG. 6, may be replaced by any other electrochemical cells disclosed herein, including those described with respect to FIG. 3 and FIG. 5. Combination of electrochemical cell types, see FIGS. 3-5, may be used in an electrochemical cell stack that includes a plurality of electrochemical cells. The anolyte and catholyte inlet and outlet ports and corresponding fluid distribution system are not show in FIG. 6. These features may be provided as known in the art.

Figure 7:
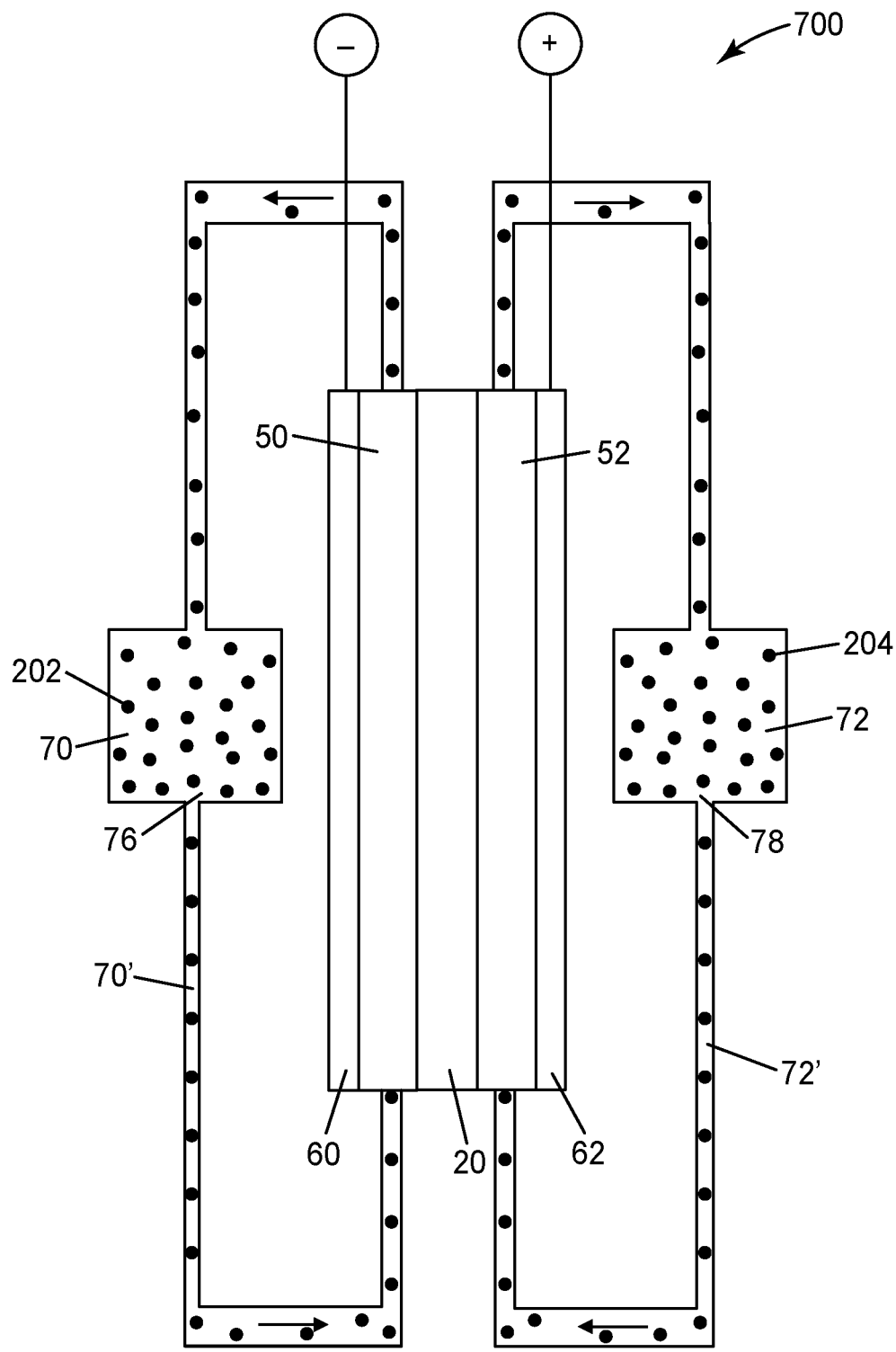
FIG. 7 is a schematic view of an exemplary single cell liquid flow battery according to one exemplary embodiment of the present disclosure.

In another embodiment, the present disclosure provides a liquid flow battery including at least one electrochemical cell according to any of the electrochemical cells of the present disclosure. FIG. 7 shows a schematic view of an exemplary single cell, liquid flow battery 700 including anode flow plate 50 and cathode flow plate 52, ion permeable membrane 20 disposed between and adjacent to the anode and cathode flow plates, current collectors 60 and 62, first electrode solution reservoir 70 and distribution system 70' containing first electrode solution 76 having electrically conductive core-shell particulate 202, second electrode solution reservoir 72 and fluid distribution 72', containing second electrode solution 78 having electrically conductive core-shell particulate 204. Pumps for the fluid distribution system are not shown. Additionally, flow channels, 55 and 55', of anode and cathode flow plates of previous FIGS. 3-6, for example, are not shown. Current collectors 60 and 62 may be connected to an external circuit which includes an electrical load (not shown). The single, electrochemical cell of liquid flow battery 700 is the same as that described in FIG. 5 and may be replaced with any of the electrochemical cell and/or electrochemical cell stacks of the present disclosure. If an electrochemical cell stack is used, the fluid distribution systems is modified to provide the appropriate fluid to each of the anode and cathode half-cells of the cell stack. For example, the single, electrochemical cell of liquid flow battery 700 may be replaced by an electrochemical cell of FIG. 3 or FIG. 4 or an electrochemical cell stack, FIG. 6, for example. Electrically conductive core-shell particulate 202 and 204 may be any of the electrically conductive core-shell particulate of the present disclosure, including electrically conductive core-shell particulate 200*a* and 200*b*, previously described. Although a single cell liquid flow battery is shown, it is known in the art that liquid flow batteries may contain multiple electrochemical cells, i.e. a cell stack. Further multiple cell stacks may be used to form a liquid flow battery, e. g. multiple cell stacks connected in series. Flow fields may be present, but this is not a requirement.

In some embodiments of the electrochemical cells of the present disclosure (see FIGS. 3-6) and the liquid flow batteries of the present disclosure (see FIG. 7), support plates (not shown if the figures) may be placed adjacent to the exterior surfaces of current collectors 60 and 62. The support plates are electrically isolated from the current collector and provide mechanical strength and support to facilitate compression of the cell assembly or battery. Additionally, the current collectors of the present disclosure can be those known in the art.

Select embodiments of the present disclosure include, but are not limited to, the following:

In a first embodiment, the present disclosure provides an electrode solution for a liquid flow battery comprising:
 an electrolyte comprising a liquid medium and at least one redox active specie, wherein the electrolyte has a density, De; and
 a core-shell particulate having a core, a shell and a density Dp, wherein at least a portion of the shell of the core-shell particulate includes an electrically conductive first metal and wherein $0.8De \leq Dp \leq 1.2De$; and
 wherein a first redox active specie of the at least one redox active specie and the electrically conductive first metal are different elements and, optionally, wherein the core of the core-shell particulate differs in at least one of chemical composition and morphology from that of the shell.

In a second embodiment, the present disclosure provides an electrode solution for a liquid flow battery according to the first embodiment, wherein $0.9De \leq Dp \leq 1.1De$.

In a third embodiment, the present disclosure provides an electrode solution for a liquid flow battery according to the first embodiment, wherein $0.95De \leq Dp \leq 1.05De$.

In a fourth embodiment, the present disclosure provides an electrode solution for a liquid flow battery according to the first embodiment, wherein $0.97De \leq Dp \leq 1.03De$.

In a fifth embodiment, the present disclosure provides an electrode solution for a liquid flow battery according to any one of the first through fourth embodiments, wherein the electrically conductive first metal of the core-shell particulate is at least one of silver, copper, gold, aluminum, magnesium, molybdenum, iridium, tungsten, zinc, lead, cobalt, nickel, manganese, ruthenium, lithium, iron, tin, platinum, palladium, tantalum, chromium, antimony, vanadium, titanium, zirconium, bismuth, indium, gallium and cerium.

In a sixth embodiment, the present disclosure provides an electrode solution for a liquid flow battery according to any one of the first through fifth embodiments, wherein the first redox active specie comprises at least one of a second metal.

In a seventh embodiment, the present disclosure provides an electrode solution for a liquid flow battery according to the sixth embodiment, wherein the second metal of the first redox active specie comprises at least one of silver, copper, gold, aluminum, magnesium, iridium, zinc, lead, cobalt, nickel, manganese, ruthenium, lithium, iron, tin, platinum, palladium, chromium, antimony, vanadium, titanium, zirconium, bismuth, indium and cerium.

In an eighth embodiment, the present disclosure provides an electrode solution for a liquid flow battery according to any one of the first through seventh embodiments, wherein the liquid medium is an aqueous liquid medium.

In a ninth embodiment, the present disclosure provides an electrode solution for a liquid flow battery according to the eighth embodiment, wherein the aqueous liquid medium comprises at least 90 percent water by weight.

In a tenth embodiment, the present disclosure provides an electrode solution for a liquid flow battery according to any one of the first through seventh embodiments, wherein the liquid medium is a non-aqueous liquid medium.

In an eleventh embodiment, the present disclosure provides an electrode solution for a liquid flow battery according to the tenth embodiment, wherein the non-aqueous liquid medium includes at least one of an alcohol, ether, ketone, ester, carbonate, nitrile, amine, amide, sulfoxide, pyrrolidone, imidazolidone, pyridine, halogenated solvent, organic acid, inorganic acid and combinations thereof.

In a twelfth embodiment, the present disclosure provides an electrode solution for a liquid flow battery according to any one of the first through eleventh embodiments, wherein the electrolyte further comprises an at least partially soluble salt, wherein the salt does not include the at least one redox active specie.

In a thirteenth embodiment, the present disclosure provides an electrode solution for a liquid flow battery according to any one of the first through twelfth embodiments, wherein the at least one redox active species is at least 50% soluble, by weight, in the liquid medium.

In a fourteenth embodiment, the present disclosure provides an electrode solution for a liquid flow battery according to any one of the first through twelfth embodiments, wherein the at least one redox active species is at least 95% soluble, by weight, in the liquid medium.

In a fifteenth embodiment, the present disclosure provides an electrode solution for a liquid flow battery according to any one of the first through fourteenth embodiments, wherein the smallest dimension of the core-shell particulate is from about 0.05 microns to about 1000 microns.

In a sixteenth embodiment, the present disclosure provides an electrode solution for a liquid flow battery according to any one of the first through fourteenth embodiments, wherein the smallest dimension of the core-shell particulate is from about 0.05 microns to about 250 microns.

In a seventeenth embodiment, the present disclosure provides an electrode solution for a liquid flow battery according to any one of the first through sixteenth embodiments, wherein the first redox active specie of the at least one redox active specie and the electrically conductive first metal of the core-shell particulate each have a higher oxidation state and a lower oxidation state and the reduction potential of the first redox active specie in its higher oxidation state is less than the reduction potential of the electrically conductive first metal in its higher oxidation state.

In an eighteenth embodiment, the present disclosure provides an electrode solution for a liquid flow battery according to the seventeenth embodiment, wherein the lower oxidation state of the first redox active specie is zero.

In a nineteenth embodiment, the present disclosure provides an electrode solution for a liquid flow battery according to the seventeenth embodiment, wherein the lower oxidation state of the first redox active specie is greater than zero.

In a twentieth embodiment, the present disclosure provides an electrode solution for a liquid flow battery according to any one of the first through sixteenth embodiments, wherein the first redox active specie of the at least one redox active specie and the electrically conductive first metal of the core-shell particulate each have a higher oxidation state and a lower oxidation state and the reduction potential of the first redox active specie in its higher oxidation state is greater than the reduction potential of the electrically conductive first metal in its higher oxidation state.

In a twenty-first embodiment, the present disclosure provides an electrode solution for a liquid flow battery according to the twentieth embodiment, wherein the lower oxidation state of the first redox active specie is zero.

In a twenty-second embodiment, the present disclosure provides an electrode solution for a liquid flow battery according to the twentieth embodiment, wherein the lower oxidation state of the first redox active specie is greater than zero.

In a twenty-third embodiment, the present disclosure provides an electrode solution for a liquid flow battery according to any one of the first through twenty-second embodiments, wherein the core comprises at least one dielectric material.

In a twenty-fourth embodiment, the present disclosure provides an electrode solution for a liquid flow battery according to any one of the first through twenty-third embodiments, wherein the core-shell particulate includes at least one of a metallized ceramic particle, metallized ceramic bubble, metallized ceramic flake, metallized ceramic rod, metallized polymer particle, metallized polymer bubble, metallized polymer flake and metallized polymer rod.

In a twenty-fifth embodiment, the present disclosure provides an electrode solution for a liquid flow battery according to any one of the first through twenty-fourth embodiments, wherein the largest dimension of the core-shell particulate is from about 0.05 microns to about 1000 microns.

In a twenty-sixth embodiment, the present disclosure provides an electrode solution for a liquid flow battery according to any one of the first through twenty-fourth embodiments, wherein the largest dimension of the core-shell particulate is from about 0.05 microns to about 250 microns.

In a twenty-seventh embodiment, the present disclosure provides an electrode solution for a liquid flow battery according to any one of the first through twenty-sixth embodiments, wherein the density of the electrode solution is from about 0.70 g/cm$^3$ to about 1.9 g/cm$^3$.

In a twenty-eighth embodiment, the present disclosure provides an electrode solution for a liquid flow battery according to any one of the first through twenty-sixth embodiments, wherein the density of the electrode solution is from about 0.75 g/cm$^3$ to about 1.7 g/cm$^3$.

In a twenty-ninth embodiment, the present disclosure provides an electrode solution for a liquid flow battery according to any one of the first through twenty-sixth embodiments, wherein the density of the electrode solution is from about 0.80 g/cm$^3$ to about 1.5 g/cm$^3$.

In a thirtieth embodiment, the present disclosure provides an electrode solution for a liquid flow battery according to any one of the first through twenty-sixth embodiments, wherein the density of the electrode solution is from about 0.85 g/cm$^3$ to about 1.3 g/cm$^3$.

In a thirty-first embodiment, the present disclosure provides an electrochemical cell for a liquid flow battery comprising:
 a first electrode solution according to any one of the first through thirtieth embodiments;
 an anode half-cell; and
 a cathode half-cell; and
 wherein at least one of the anode half-cell and cathode half-cell does not contain a stationary porous electrode and the first electrode solution is contained in the half-cell that does not contain a stationary porous electrode.

In a thirty-second embodiment, the present disclosure provides an electrochemical cell for a liquid flow battery according to the thirty-first embodiment, wherein the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode.

In a thirty-third embodiment, the present disclosure provides an electrochemical cell for a liquid flow battery according to the thirty-first embodiment, wherein the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the first electrode solution is contained in the cathode half-cell and the cathode half-cell does not contain a stationary porous electrode.

In a thirty-fourth embodiment, the present disclosure provides an electrochemical cell for a liquid flow battery according to the thirty-second embodiment, further comprising a second electrode solution according to any one of the first through thirtieth embodiments, wherein the first redox active specie of the at least one redox active specie and the electrically conductive first metal of the core-shell particulate, of the second electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the second electrode solution is contained in the cathode half-cell and the cathode half-cell does not contain a stationary porous electrode.

In a thirty-fifth embodiment, the present disclosure provides an electrochemical cell for a liquid flow battery according to the thirty-fourth embodiment, further comprising:
  an anode flow plate and a first current collector, wherein the anode flow plate is in electrical communication with the first current collector and the first electrode solution; and
  a cathode flow plate and a second current collector, wherein the cathode flow plate is in electrical communication with the second current collector and the second electrode solution.

In a thirty-sixth embodiment, the present disclosure provides an electrochemical cell for a liquid flow battery according to the any one of the thirty-first through thirty-fifth embodiments, further comprising an ion permeable membrane, disposed between the anode half-cell and cathode half-cell.

In a thirty-seventh embodiment, the present disclosure provides an electrochemical cell for a liquid flow battery according to the thirty-sixth embodiment, wherein the ion permeable membrane is an ion exchange membrane.

In a thirty-eighth embodiment, the present disclosure provides a liquid flow battery comprising a first electrode solution according to any one of the first through thirtieth embodiments.

In a thirty-ninth embodiment, the present disclosure provides a liquid flow battery comprising an electrochemical cell according to any one of the thirty-first through thirty-seventh embodiments.

What is claimed:

1. An electrode solution for a liquid flow battery comprising:
  an electrolyte comprising a liquid medium and at least one redox active specie, wherein the electrolyte has a density, De; and
  a core-shell particulate having a core, a shell and a density Dp, wherein at least a portion of the shell of the core-shell particulate includes an electrically conductive first metal and wherein $0.8De \leq Dp \leq 1.2De$; and
  wherein a first redox active specie of the at least one redox active specie and the electrically conductive first metal are different elements.

2. The electrode solution for a liquid flow battery of claim 1, wherein the electrically conductive first metal of the core-shell particulate is at least one of silver, copper, gold, aluminum, magnesium, molybdenum, iridium, tungsten, zinc, lead, cobalt, nickel, manganese, ruthenium, lithium, iron, tin, platinum, palladium, tantalum, chromium, antimony, vanadium, titanium, zirconium, bismuth, indium, gallium and cerium.

3. The electrode solution for a liquid flow battery of claim 1, wherein the first redox active specie comprises at least one of a second metal, wherein the second metal of the first redox active specie comprises at least one of silver, copper, gold, aluminum, magnesium, iridium, zinc, lead, cobalt, nickel, manganese, ruthenium, lithium, iron, tin, platinum, palladium, chromium, antimony, vanadium, titanium, zirconium, bismuth, indium and cerium.

4. The electrode solution for a liquid flow battery of claim 1, wherein the liquid medium is an aqueous liquid medium.

5. The electrode solution for a liquid flow battery of claim 1, wherein the liquid medium is a non-aqueous liquid medium, wherein the non-aqueous liquid medium includes at least one of an alcohol, ether, ketone, ester, carbonate, nitrile, amine, amide, sulfoxide, pyrrolidone, imidazolidone, pyridine, halogenated solvent, organic acid, inorganic acid and combinations thereof.

6. The electrode solution for a liquid flow battery of claim 1, wherein the electrolyte further comprises an at least partially soluble salt, wherein the salt does not include the at least one redox active specie.

7. The electrode solution for a liquid flow battery of claim 1, wherein the at least one redox active species is at least 95% soluble, by weight, in the liquid medium.

8. The electrode solution for a liquid flow battery of claim 1, wherein the smallest dimension of the core-shell particulate is from about 0.05 microns to about 250 microns.

9. The electrode solution for a liquid flow battery of claim 1, wherein the first redox active specie of the at least one redox active specie and the electrically conductive first metal of the core-shell particulate each have a higher oxidation state and a lower oxidation state and the reduction potential of the first redox active specie in its higher oxidation state is less than the reduction potential of the electrically conductive first metal in its higher oxidation state.

10. The electrode solution for a liquid flow battery of claim 1, wherein the first redox active specie of the at least one redox active specie and the electrically conductive first metal of the core-shell particulate each have a higher oxidation state and a lower oxidation state and the reduction potential of the first redox active specie in its higher oxidation state is greater than the reduction potential of the electrically conductive first metal in its higher oxidation state.

11. The electrode solution for a liquid flow battery of claim 1, wherein the core comprises at least one dielectric material.

12. The electrode solution for a liquid flow battery of claim 1, wherein the core-shell particulate includes at least one of a metallized ceramic particle, metallized ceramic bubble, metallized ceramic flake, metallized ceramic rod, metallized polymer particle, metallized polymer bubble, metallized polymer flake and metallized polymer rod.

13. The electrode solution for a liquid flow battery of claim 1, wherein the largest dimension of the core-shell particulate is from about 0.05 microns to about 250 microns.

14. An electrochemical cell for a liquid flow battery comprising:
  a first electrode solution according to claim 1;
  an anode half-cell; and
  a cathode half-cell; and
  wherein at least one of the anode half-cell and cathode half-cell does not contain a stationary porous electrode and the first electrode solution is contained in the half-cell that does not contain a stationary porous electrode.

15. The electrochemical cell for a liquid flow battery of claim 14, wherein the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is less than the reduction potential of the electrically conductive first metal in its higher oxidation state and the conductive first metal of the core-shell particulate is an anode and the first electrode solution is contained in the anode half-cell and the anode half-cell does not contain a stationary porous electrode.

16. The electrochemical cell for a liquid flow battery of claim 14, wherein the first redox active specie of the at least one redox active specie and the electrically conductive first metal of the core-shell particulate, of the first electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the first electrode solution is contained in the cathode half-cell and the cathode half-cell does not contain a stationary porous electrode.

17. The electrochemical cell for a liquid flow battery of claim 15, further comprising a second electrode solution according to claim 1 wherein the first redox active specie of the at least one redox active specie and the electrically conductive first metal of the core-shell particulate, of the second electrode solution, each have a higher oxidation state and a lower oxidation state and the reduction potential of the first redox active specie in its higher oxidation state is greater than the reduction potential of the electrically conductive first metal in its higher oxidation state and the conductive first metal of the core-shell particulate is a cathode and the second electrode solution is contained in the cathode half-cell and the cathode half-cell does not contain a stationary porous electrode.

18. The electrochemical cell for a liquid flow battery of claim 17, further comprising an ion permeable membrane, disposed between the anode half-cell and cathode half-cell.

19. The electrochemical cell for a liquid flow battery of claim 14, further comprising:
   an anode flow plate and a first current collector, wherein the anode flow plate is in electrical communication with the first current collector and the first electrode solution; and
   a cathode flow plate and a second current collector, wherein the cathode flow plate is in electrical communication with the second current collector and the second electrode solution.

20. A liquid flow battery comprising a first electrode solution according to claim 1.

* * * * *